United States Patent
Sumiya et al.

(10) Patent No.: US 10,580,592 B2
(45) Date of Patent: Mar. 3, 2020

(54) METHOD FOR MANUFACTURING ELECTRODE MATERIAL, CELL, AND CAPACITOR; AND DEVICE FOR MANUFACTURING ELECTRODE MATERIAL

(71) Applicant: JSR Corporation, Minato-ku (JP)

(72) Inventors: Koji Sumiya, Minato-ku (JP); Shigehito Asano, Minato-ku (JP); Yasuyuki Koga, Minato-ku (JP); Ryo Kimura, Minato-ku (JP); Tsutomu Reiba, Minato-ku (JP); Terukazu Kokubo, Minato-ku (JP); Nobuo Ando, Minato-ku (JP)

(73) Assignee: JSR Corporation, Minato-ku (JP)

( * ) Notice: Subject to any disclaimer, the term of this patent is extended or adjusted under 35 U.S.C. 154(b) by 79 days.

(21) Appl. No.: 15/763,598

(22) PCT Filed: Sep. 28, 2016

(86) PCT No.: PCT/JP2016/078669
§ 371 (c)(1),
(2) Date: Mar. 27, 2018

(87) PCT Pub. No.: WO2017/057486
PCT Pub. Date: Apr. 6, 2017

(65) Prior Publication Data
US 2018/0301291 A1    Oct. 18, 2018

(30) Foreign Application Priority Data

Sep. 28, 2015  (JP) ................... 2015-189852
Dec. 18, 2015  (JP) ................... 2015-247368
Apr. 28, 2016  (JP) ................... 2016-091700

(51) Int. Cl.
*H01M 4/04*     (2006.01)
*H01M 10/05*    (2010.01)
(Continued)

(52) U.S. Cl.
CPC ............. *H01G 11/86* (2013.01); *H01G 11/32* (2013.01); *H01G 11/42* (2013.01); *H01G 11/46* (2013.01);
(Continued)

(58) Field of Classification Search
None
See application file for complete search history.

(56) References Cited

U.S. PATENT DOCUMENTS 6,110,484 A  *  8/2000  Sierra ................... A61L 27/225
                                                    424/422
6,431,465 B1 *  8/2002  Yie ........................ A62C 5/008
                                                    239/88
(Continued)

FOREIGN PATENT DOCUMENTS

EP    2 605 316 A1    6/2013
JP    61-16473 A      1/1986
(Continued)

OTHER PUBLICATIONS

Office Action dated Jan. 8, 2019 in Japanese Patent Application No. 2017-543505, 8 pages (with unedited computer generated English translation).
(Continued)

*Primary Examiner* — Scott J. Chmielecki
(74) *Attorney, Agent, or Firm* — Oblon, McClelland, Maier & Neustadt, L.L.P.

(57) ABSTRACT

Provided is a method for manufacturing an electrode material having a pressing step in which an irregularly shaped aggregate containing at least an active material is statically pressed in the presence of an alkali metal source and a solvent.

15 Claims, 13 Drawing Sheets

(51) Int. Cl.
  *H01M 4/02* (2006.01)
  *H01G 11/86* (2013.01)
  *H01M 4/587* (2010.01)
  *H01G 11/50* (2013.01)
  *H01G 11/42* (2013.01)
  *H01G 11/32* (2013.01)
  *H01G 11/46* (2013.01)
  *H01G 11/06* (2013.01)

(52) U.S. Cl.
  CPC ............. *H01G 11/50* (2013.01); *H01M 4/04* (2013.01); *H01M 4/587* (2013.01); *H01M 10/05* (2013.01); *H01G 11/06* (2013.01); *H01M 2004/027* (2013.01); *H01M 2004/028* (2013.01)

(56) References Cited

U.S. PATENT DOCUMENTS

| | | | |
|---|---|---|---|
| 2005/0130043 A1 | 6/2005 | Gao et al. | |
| 2009/0305095 A1* | 12/2009 | Sarata | C01B 3/065 429/447 |
| 2013/0280599 A1* | 10/2013 | Matsumoto | H01G 9/016 429/200 |
| 2013/0284988 A1 | 10/2013 | Satake et al. | |
| 2015/0357672 A1* | 12/2015 | Hong | H01M 10/056 429/306 |
| 2016/0204407 A1* | 7/2016 | Kai | C05F 7/00 429/144 |
| 2016/0204466 A1* | 7/2016 | Nogami | H01M 4/136 429/322 |
| 2016/0322630 A1* | 11/2016 | Oyama | H01M 4/366 |
| 2017/0012283 A1* | 1/2017 | Mizuno | H01M 4/0404 |
| 2017/0054130 A1* | 2/2017 | Roh | H01M 2/30 |
| 2017/0092941 A1* | 3/2017 | Yamaya | H01M 2/162 |
| 2017/0110694 A1* | 4/2017 | Wang | H01M 2/0275 |
| 2017/0323738 A1* | 11/2017 | Mitra | H01G 11/86 |
| 2018/0205122 A1* | 7/2018 | Gupta | H01M 10/54 |
| 2018/0226646 A1* | 8/2018 | Furuichi | H01M 4/36 |

FOREIGN PATENT DOCUMENTS

| | | |
|---|---|---|
| JP | 5-41249 A | 2/1993 |
| JP | 7-235330 A | 9/1995 |
| JP | 9-63650 A | 3/1997 |
| JP | 9-293499 A | 11/1997 |
| JP | 2000-156222 A | 6/2000 |
| JP | 2007-500922 A | 1/2007 |
| JP | 2007-67105 A | 3/2007 |
| JP | 2008-150270 A | 7/2008 |
| JP | 2009-224334 A | 10/2009 |
| JP | 2012-69894 A | 4/2012 |
| JP | 2012-204306 A | 10/2012 |
| JP | 2012-209195 A | 10/2012 |
| WO | WO 2005/013397 A1 | 2/2005 |

OTHER PUBLICATIONS

International Preliminary Report on Patentability and Written Opinion dated Apr. 12, 2018 in PCT/JP2016/078669, filed Sep. 28, 2016 (with English translation).
Notification of Reasons for Refusal dated Sep. 11. 2018 in Japanese Patent Application No. 2017-543505 (with English translation).
International Search Report dated Dec. 27, 2016 in PCT/JP2016/078669 filed Sep. 28, 2016.
Extended European Search Report dated May 2, 2019, in Patent Application No. 16851657.3, 8 pages.

* cited by examiner

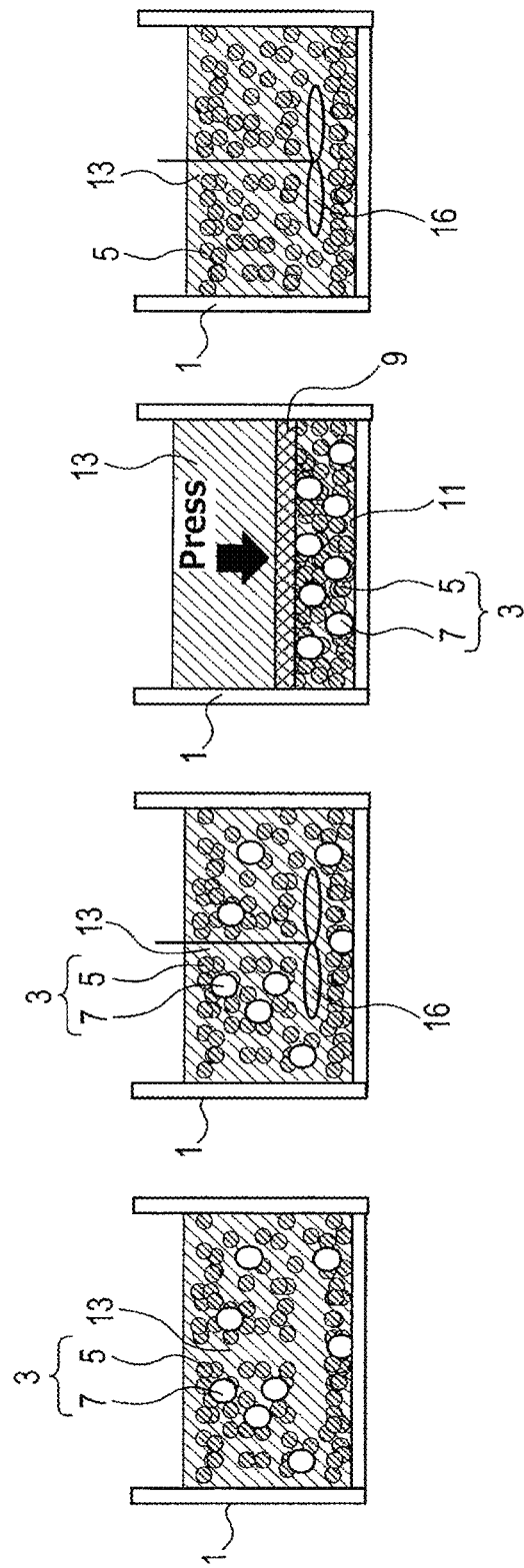

METHOD FOR MANUFACTURING ELECTRODE MATERIAL, CELL, AND CAPACITOR; AND DEVICE FOR MANUFACTURING ELECTRODE MATERIAL

CROSS-REFERENCE TO RELATED APPLICATION

This PCT International Application claims priority to Japanese Unexamined Patent Application No. 2015-189852 filed in Japan Patent Office on Sep. 28, 2015, Japanese Unexamined Patent Application No. 2015-247368 filed in Japan Patent Office on Dec. 18, 2015, and Japanese Unexamined Patent Application No. 2016-091700 filed in Japan Patent Office on Apr. 28, 2016, and all the contents of Japanese Unexamined Patent Application No. 2015-189852, Japanese Unexamined Patent Application No. 2015-247368, and Japanese Unexamined Patent Application No. 2016-091700 are incorporated in this PCT International Application by reference.

TECHNICAL FIELD

This disclosure relates to a method of manufacturing an electrode material, a cell, and a capacitor, and a device for manufacturing an electrode material.

BACKGROUND ART

In recent years, with remarkable reductions in the size and weight of electronic equipment, there has been a growing demand for reducing the sizes and weights of cells used as a power source for driving the electronic equipment.

To meet such a demand for reductions in size and weight, nonaqueous electrolyte rechargeable cells, typified by lithium ion rechargeable cells, have been developed. In addition, lithium ion capacitors are known as a battery device for an application that requires high-energy density characteristics and high-output characteristics. Sodium ion cells and capacitors are also known, which contain sodium that can be obtained at low cost and is naturally abundant compared with lithium.

For these cells and capacitors, for a variety of purposes, a process of doping an electrode active material with alkali metal in advance (generally referred to as "pre-doping") is employed. For example, for lithium ion capacitors, pre-doping with lithium is performed for the purpose of decreasing the potential of the negative electrode and increasing energy density. In this case, a method involving in-cell pre-doping with the active material of the negative electrode by using a charge collector having a through-hole is typically employed (see Patent Document 1, for example).

Meanwhile, for lithium ion rechargeable cells, pre-doping is performed for the purpose of reducing the irreversible capacitance of the negative electrode. In this case, in addition to the aforementioned method, a method involving pre-doping of the active material of the negative electrode before assembly of the cell is employed (see Patent Documents 2 and 3, for example). For fabricating sodium-ion battery devices, a method involving pre-doping of the negative electrode with sodium before assembly of a battery device is employed (Patent Document 4).

Patent Document 5 proposes, to suppress decomposition of an electrolyte solution on a negative electrode during initial charging of a rechargeable cell, making a fibrous carbon material, which is used as the negative electrode, in contact with n-butyl lithium in a nonaqueous solvent so that lithium ions can be trapped in the fibrous carbon material.

However, the aforementioned conventional methods are not practical in terms of manufacturing cost and convenience. Besides, in the aforementioned conventional methods, pre-doping is performed on a workpiece formed into an electrode (i.e., an active material layer formed on a charge collector). In this case, an insulating binder is partially bonded to active material particles; therefore, the problem arises that non-uniform progress of pre-doping causes speckles at a so-called solid electrolyte interface (SEI) coating.

On the other hand, Patent Document 6 proposes a method of performing pre-doping with lithium ions quickly, uniformly, and with facility: in the method, pre-doping is performed in such a manner that a material that can be doped with lithium, a lithium metal, and a ball are blended and mixed in the presence of a solvent, using collision and friction with the ball.

Patent Document 7 discloses a method of manufacturing an active material with excellent doping efficiency: in the method, a mixture of an active material and a lithium metal is, for example, stirred or blended in a specific solvent to cause collision between the active material and the lithium metal.

The methods proposed in Patent Documents 6 and 7 do not use an insulating binder or the like and are therefore advantageous in that pre-doping progresses uniformly.

PRIOR ART DOCUMENTS

Patent Documents

Patent Document 1: Japanese Unexamined Patent Application Publication No. 2007-67105
Patent Document 2: Japanese Unexamined Patent Application Publication No. H7-235330
Patent Document 3: Japanese Unexamined Patent Application Publication No. H9-293499
Patent Document 4: Japanese Unexamined Patent Application Publication No. 2012-69894
Patent Document 5: Japanese Unexamined Patent Application Publication No. 2000-156222
Patent Document 6: Japanese Unexamined Patent Application Publication No. 2012-204306
Patent Document 7: Japanese Unexamined Patent Application Publication No. 2012-209195

SUMMARY OF THE INVENTION

Problems to be Solved by the Invention

However, the methods proposed in Patent Documents 6 and 7 require high-speed stirring during blending and mixing, which means that mass production of a pre-doped electrode material requires much energy; thus, they are problematic in terms of manufacturing cost. Besides, safety concerns arise from the fact that heavy collision occurs between an active material and a lithium metal. The method proposed in Patent Document 6 also has a problem of mixture of impurities, which occur from abrasion of the ball, to an electrode material.

One aspect of this disclosure preferably provides an electrode material manufacturing method allowing an alkali metal pre-doped high-quality electrode material to be manufactured at low cost with safety, a method of manufacturing a cell and a capacitor, and a device for manufacturing an electrode material.

Means for Solving the Problems

One aspect of this disclosure is a method of manufacturing an electrode material, comprising a pressurization step in which, in the presence of an alkali metal supply and a solvent, an amorphous aggregation containing at least an active material is in a statically pressurized state. With the method of manufacturing an electrode material according to one aspect of this disclosure, a high-quality electrode material can be manufactured at low cost.

Another aspect of this disclosure is a method of manufacturing a cell comprising at least one of a negative electrode and a positive electrode, wherein at least one of the negative electrode and the positive electrode is manufactured using the electrode material manufactured by the method of manufacturing the electrode material. With another aspect of the method of manufacturing a cell according to this disclosure, a high-performance cell can be manufactured at low cost.

Another aspect of this disclosure is a method of manufacturing a capacitor comprising at least one of a negative electrode and a positive electrode, wherein at least one of the negative electrode and the positive electrode is manufactured using the electrode material manufactured by the method of manufacturing the electrode material. With another aspect of the method of manufacturing a capacitor according to this disclosure, a high-performance capacitor can be manufactured at low cost.

Another aspect of this disclosure is a device for manufacturing an electrode material, comprising: (A) a container containing an alkali metal supply, a solvent, and an amorphous aggregation containing at least an active material; and (B) a pressure unit for pressurizing the aggregation. With another aspect of the device for manufacturing an electrode material of this disclosure, the method of manufacturing an electrode material can be easily implemented.

BRIEF DESCRIPTION OF THE DRAWINGS

FIGS. 13A to 13D are diagrams for explaining the steps of a method of manufacturing an electrode material.

EXPLANATION OF REFERENCE NUMERALS

Figure 1:
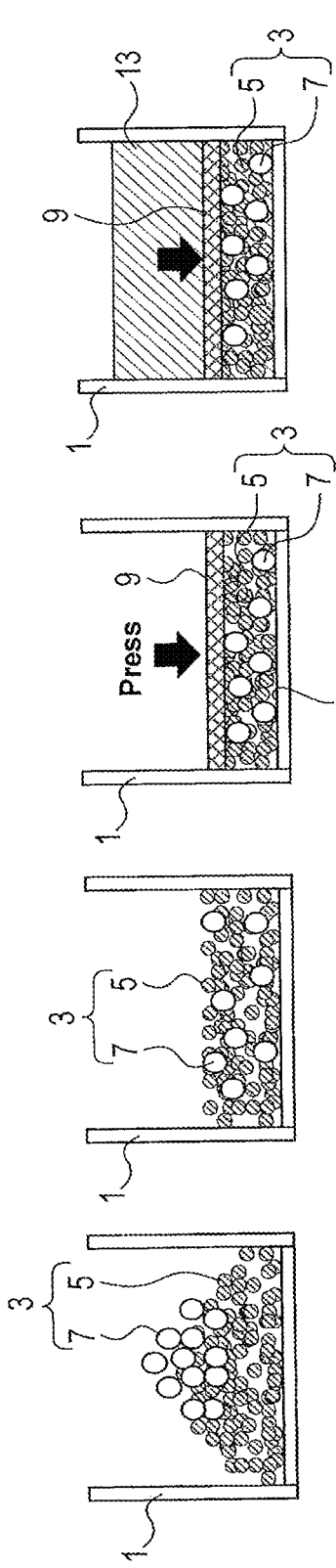
FIGS. 1A to 1F are diagrams for explaining the steps of a method of manufacturing an electrode material.

1 . . . container, 3 . . . aggregation, 5 . . . particulate active material, 7 . . . particulate alkali metal supply, 9, 17 . . . press unit, 11 . . . inner surface, 13 . . . electrolyte solution, 15 . . . alkali metal supply, 16 . . . stirring blade, 19 . . . conductor, 20 . . . salient, 21 . . . recess, 22 . . . ammeter, 23 . . . container, 25 . . . filter housing, 27 . . . pipe, 29, 31 . . . opening, 33 . . . inlet, 35 . . . filter, 37 . . . outlet, 39 . . . porous metal plate, 41 . . . alkali metal supply holder unit, 43 . . . housing, 45 . . . conductor, 47 . . . aggregation, 49 . . . stainless steel container, 51 . . . hole-punched copper foil, 53 . . . polypropylene ring, 55 . . . lithium metal piece, 57 . . . polypropylene container, 59 . . . electrolyte solution

MODE FOR CARRYING OUT THE INVENTION

Embodiments of this disclosure will be described.

1. Method of Manufacturing Electrode Material

A method of manufacturing an electrode material according to this disclosure includes a pressurization step in which an amorphous aggregation containing at least an active material is in a statically pressurized state in the presence of an alkali metal supply and a solvent.

It should be noted that "in the presence of an alkali metal supply" includes "in the presence of an alkali metal supply out of an aggregation", "in the presence of an alkali metal supply in an aggregation", and "in the presence of an alkali metal supply out of an aggregation and in the aggregation".

Examples of the alkali metal in the alkali metal supply include lithium and sodium. There is no limitation on the form of the alkali metal supply, and an alkali metal plate, an alkali metal alloy plate, or the like can be used as the alkali metal supply. The alkali metal supply may be disposed on a conductive substrate. The conductive substrate may be porous. Examples of the material for the conductive substrate include, copper, stainless steel, and nickel.

In addition, the form of the alkali metal supply may be particles (e.g., alkali metal particles or alkali metal alloy particles), a foil, an alkali metal piece, or an alkali metal alloy piece (hereinafter referred to as particles or other forms).

The alkali metal supply in particles or other forms may be part of an amorphous aggregation containing at least an active material. In this case, to increase the doping speed, the alkali metal supply in particles or other forms is preferably fragmented into small or minute particles. When an alkali metal supply in the form of a foil is used, its thickness is preferably in the range of 10 to 500 μm, and when a particulate alkali metal supply is used, its average grain size is preferably in the range of 10 to 500 μm.

The solvent can be any solvent that has alkali metal ion conductivity, and is preferably an organic solvent, specifically a nonprotic organic solvent. Examples of a nonprotic organic solvent include ethylene carbonate, propylene carbonate, butylene carbonate, dimethyl carbonate, diethyl carbonate, methyl ethyl carbonate, γ-butyrolactone, acetonitrile, dimethoxyethane, tetrahydrofuran, dioxolane, methylene chloride, and sulfolane. The organic solvent may be composed of a single component or may be a mixed solvent consisting of two or more components.

The solvent preferably contains a dissolved alkali metal salt.

Examples of the alkali metal salt include lithium salt and sodium salt. Examples of the anion part of an alkali metal salt include a phosphorous anion containing a fluoro group, such as, $PF_6^-$, $PF_3(C_2F_5)_3^-$, or $PF_3(CF_3)_3^-$; a boron anion containing a fluoro group or cyano group, such as $BF_4^-$, $BF_2(CF)_2^-$, $BF_3(CF_3)^-$, or $B(CN)_4^-$; a sulfonylimide anion containing a fluoro group, such as $N(FSO_2)_2^-$, $N(CF_3SO_2)_2^-$, or $N(C_2F_5SO_2)_2^-$; and an organic sulfonic acid anion containing a fluoro group, such as $CF_3SO_3^-$. In the solvent, a single alkali metal salt or two or more alkali metal salts may be dissolved.

In a solution in which an alkali metal salt is dissolved (hereinafter referred to as "electrolyte solution"), the concentration of the alkali metal ion (alkali metal salt) is preferably 0.1 mol/L or more, more preferably in the range of 0.5 to 1.5 mol/L. Within this range, doping of the active material with an alkali metal progresses efficiently.

The solvent may further contain a dissolved additive, such as vinylene carbonate, vinylethylene carbonate, 1-fluoroethylene carbonate, 1-(trifluoromethyl)ethylene carbonate, succinic anhydride, maleic anhydride, propane sultone, or diethyl sulfone.

The solvent may be still relatively to the aggregation or may steadily flow. For example, a flow of the solvent may pass through the aggregation (e.g., an aggregation of particles). In this case, the flow of the solvent may circulate in a closed system. Alternatively, the solvent may be part of an amorphous aggregation containing an active material. The aggregation may be in the form of, for example, a slurry or a cake containing the solvent.

"In the presence of an alkali metal supply and a solvent" refers to the state where (1) an alkali metal from the alkali metal supply and an active material contained in an aggregation are electrically connected to each other, (2) the solvent and the active material contained in the aggregation are in contact with each other, and (3) the alkali metal supply and the solvent are in contact with each other.

The aforementioned (1) refers to, for example, the state where the alkali metal supply and the active material contained in the aggregation are in a direct contact with each other, or the state where a conductive member is present between the alkali metal supply and the active material contained in the aggregation.

The aggregation contains at least an active material. The active material may be any electrode active material that is applicable to a battery device involving insertion/removal of alkali metal ions, and may be either a negative electrode active material or positive electrode active material.

Examples of the negative electrode active material, which may be any material, include carbon materials, such as a composite carbon material composed of graphite, easily graphitizable carbon, hardly graphitized carbon, or graphite particles coated with a carbide of a pitch or resin; and materials containing metals or semimetals that can be alloyed with lithium, such as Si and Sn, or the oxides thereof. A specific example of the carbon material is the carbon material described in Japanese Patent Laid-Open No. 2013-258392. Specific examples of materials containing metals or semimetals that can be alloyed with lithium or oxides thereof are the materials described in Japanese Patent Laid-Open Nos. 2005-123175 and 2006-107795.

Examples of the positive electrode active material include transition metal oxides, such as manganese oxide and vanadium oxide; sulfur active materials, such as elemental sulfur, metal sulfide, and disulfide; and carbon materials, such as polyacene organic semiconductor (PAS) and activated carbon. In addition, a method of manufacturing an electrode material according to this disclosure allows for supplement of lithium deficiency in positive electrode active materials, that is, alkali metal transition metal complex oxides, such as lithium cobalt oxide, lithium nickel oxide, lithium manganese oxide, sodium cobalt oxide, sodium nickel oxide, and sodium manganese oxide.

A positive electrode active material and a negative electrode active material may each be composed of a single substance or a mixture of two or more substances. A method of manufacturing an electrode material according to this disclosure is suitable for doping a negative electrode active material with an alkali metal, especially for doping a negative electrode active material containing a carbon material or Si, or the oxide thereof.

It should be noted that, in this disclosure, doping with an alkali metal (hereinafter also simply referred to as "doping") is a generic name for providing the state in which an alkali metal in the metallic state, ionic state, compound state, or other states is absorbed, intercalated, inserted, supported, and alloyed.

In general, when a carbon material is used as an active material and the grain size of the carbon material is small, the obtained battery device has low internal resistance, while the problem arises that the irreversible capacitance becomes high and a large amount of gas is generated when the battery device is held in the charge status, for example. Use of a method of manufacturing an electrode according to this disclosure can ease this problem even when a carbon material having a 50% volume cumulative diameter D50 of 0.1 to 10 µm is used as an active material. It should be noted that a 50% volume cumulative diameter D50 is a value measured by laser diffraction and the scattering method.

In general, when a material containing Si or the oxide thereof is used as an active material, the irreversible capacitance tends to become high. Use of a method of manufacturing an electrode according to this disclosure can ease this problem.

The aggregation may be a mixture of an active material and another component. Examples of the other component include an alkali metal supply, a solvent, and a conductive aid. Examples of the conductive aid include carbon black, vapor-grown carbon fiber, and particles of a metal other than an alkali metal. If the aggregation contains a conductive aid, the doping speed can be increased. If the active material is the carbon material, the content of the active material in the aggregation is preferably 90 mass % or more of all the components except the alkali metal supply and the solvent. Meanwhile, if the active material is a material containing the aforementioned Si or the oxide thereof, the content of the active material in the aggregation is preferably 50 mass % or more of all the components except the alkali metal supply and the solvent. It should be noted that the content of the binder in the aggregation is generally 5 mass % or less, preferably 1 mass % or less of the active material, and most preferably, the aggregation does not contain a binder.

The form of the aggregation is amorphous. "Amorphous" refers to the state where the shape of the overall aggregation is variable. An amorphous aggregation containing an active material is not the one formed into an electrode. A method of manufacturing an electrode material according to this disclosure differs from the methods disclosed in aforementioned Patent Documents 1 to 5 at least in that it uses an amorphous aggregation containing an active material.

Examples of an amorphous aggregation include particles (particulate material), a slurry, and a cake. A particulate aggregation may be composed of particles of an active material or composed of particles of an active material and particles of another component. Particles of another component may be, for example, particles of an alkali metal supply or particles of the conductive aid.

The aforementioned statically pressurized state refers to the state where a still-standing (substantially unmixed or unstirred) aggregation is pressurized. It should be noted that the statically pressurized state includes the case where the shape of the aggregation changes (e.g., a reduction in the thickness of the aggregation) due to pressurization, and the case where the overall aggregation together is pressurized while being moved by a conveyor belt or the like. The pressurization is to apply a pressure higher than normal pressure. Pressurization of an amorphous aggregation containing an active material leads to a reduction in the contact resistance between active material particles, thereby allowing the overall active material contained in the aggregation to be doped with an alkali metal rapidly and uniformly. Further, in the statically pressurized state, a violent collision between an active material particle and an alkali metal is unlikely to occur and safety is ensured.

Figure 2:
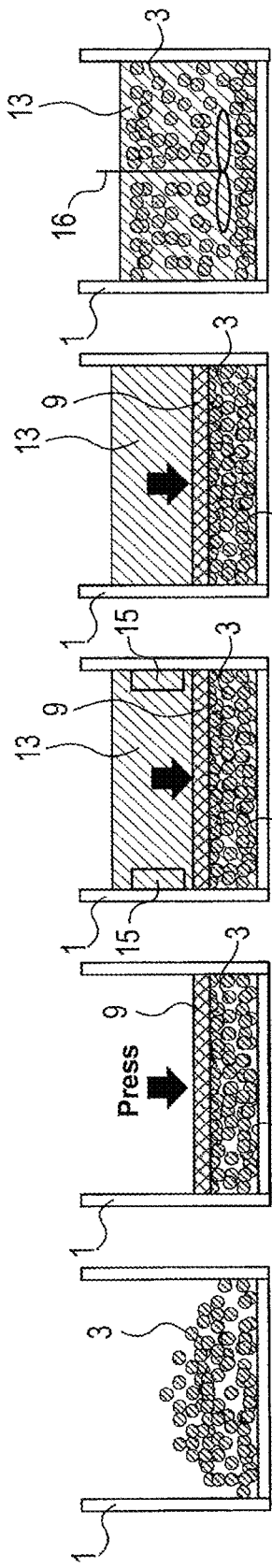
FIGS. 2A to 2E are diagrams for explaining the steps of a method of manufacturing an electrode material.

In the pressurization step, an appropriate method of statically pressurizing the aggregation can be selected. As shown in FIGS. 1D, 2C, and 13C, in a method of statically pressurizing the aggregation in the pressurization step, for example, an aggregation 3 contained in a container 1 is pressed through a press unit 9 toward the inner surface 11 of the container 1 to pressurize the aggregation 3.

In the examples shown in FIGS. 1D and 13D, the aggregation 3 is composed of particles of an active material and particles of an alkali metal supply, while in the example shown in FIG. 2C, the aggregation 3 is composed of only particles of an active material.

Figure 4:
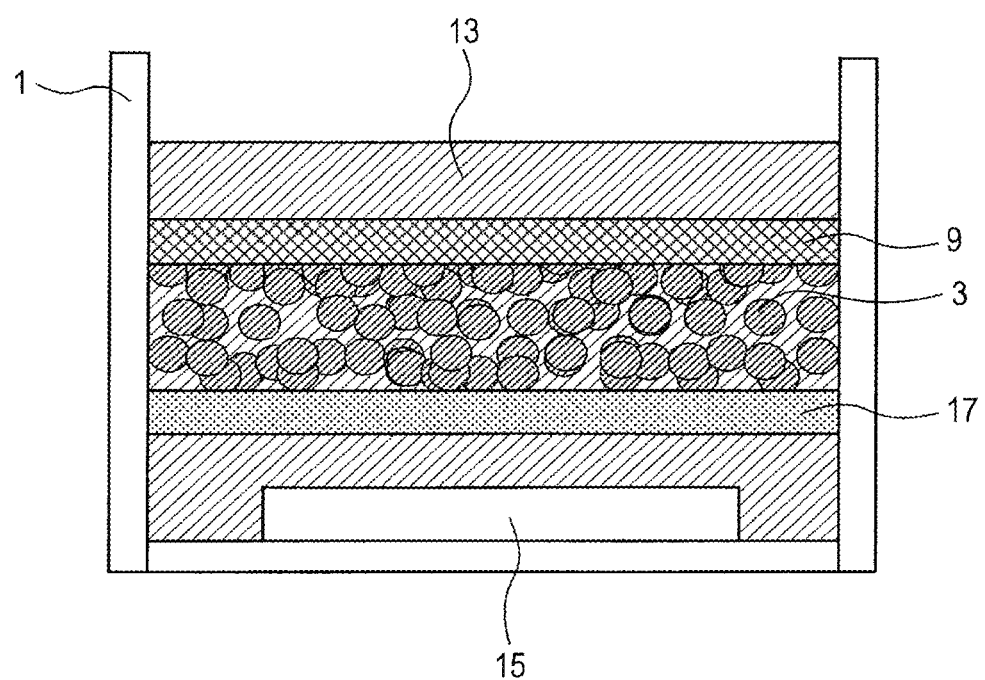
FIG. 4 is a diagram for explaining a method of manufacturing an electrode material.

As shown in FIG. 4, in another method of statically pressurizing the aggregation in the pressurization step, for example, the aggregation 3 is pressurized through a pair of press units 9 and 17 between which the aggregation 3 is sandwiched. In the example shown in FIG. 4, the press unit 17 may press the aggregation 3 upward with the press unit 9 in a fixed position; the press unit 9 may press the aggregation 3 downward with the press unit 17 in a fixed position; or the press unit 9 may press the aggregation 3 downward while the press unit 17 presses the aggregation 3 upward.

Each press unit may be in any form that allows the aggregation to be pressed, for example, a plate, rod, or sphere. Each press unit preferably has a plurality of through-holes. With a plurality of through-holes, a solvent or alkali metal ions can pass therethrough. Examples of the material for the press units include a metal, glass, resin, and nonwoven fabric.

Figure 6:
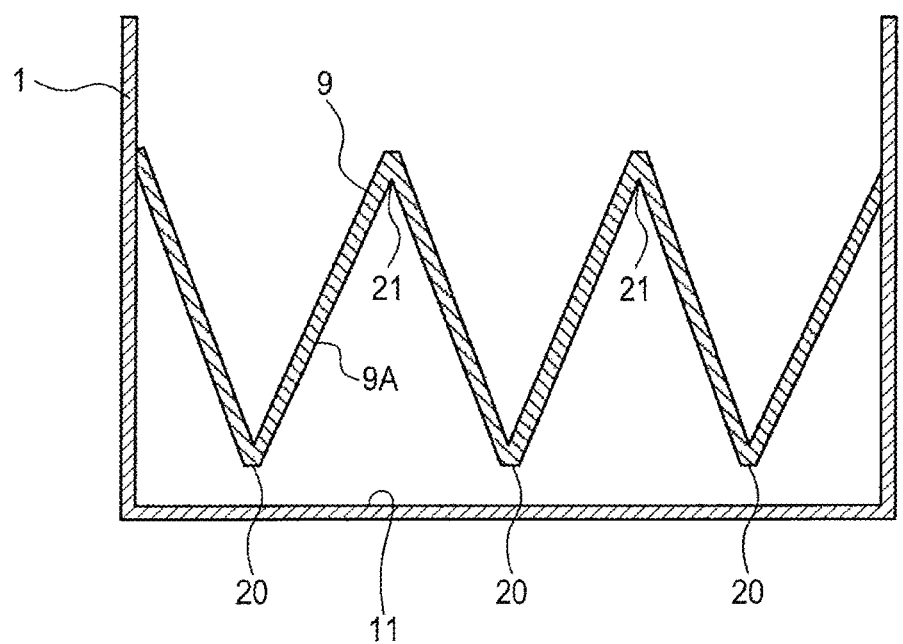
FIG. 6 is a cross-sectional side view showing the shape of a press unit 9.

The press units preferably have asperities on a surface adjoining the aggregation. As shown in FIG. 6, an example of a press unit having asperities is the press unit 9 having a zigzag pattern when viewed from the side. In this press unit 9, a surface 9A adjoining the aggregation has alternating peak portions, i.e., salients 20, and trough portions, i.e., recesses 21.

Figure 7A:
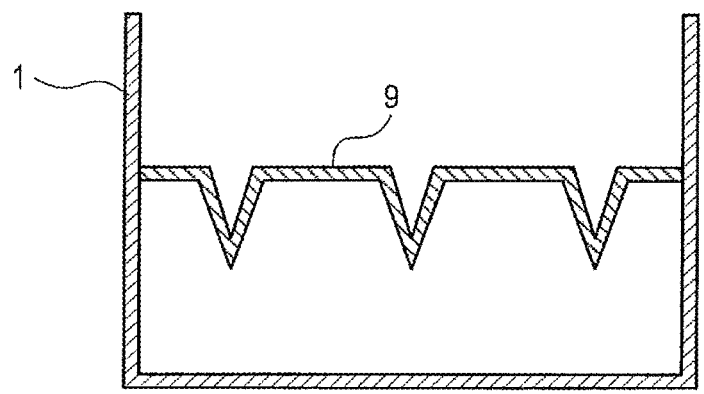
FIGS. 7A to 7C are cross-sectional side views showing the shapes of press units.
Figure 7B:
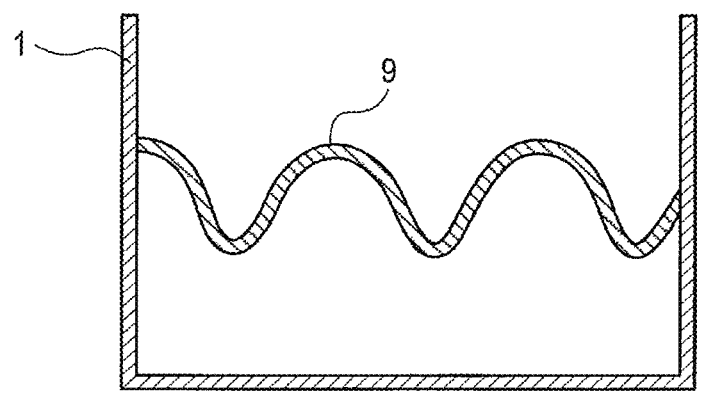
Figure 7C:
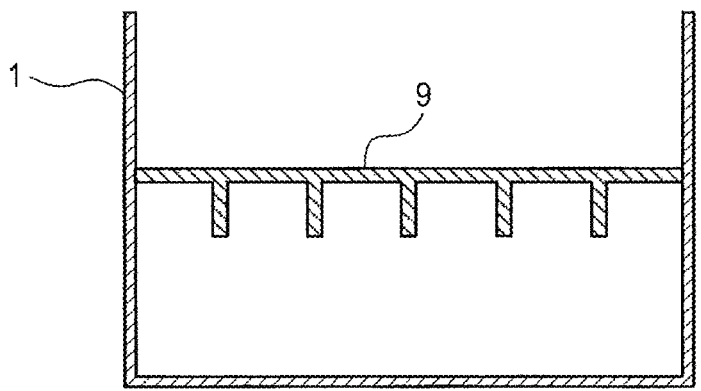

Another example of a press unit having asperities is the press unit 9 shown in FIGS. 7A to 7C. In the example shown in FIG. 7A, an inversed v-shaped salient and a recess with a flat bottom alternate. In the example shown in FIG. 7B, a curved salient and a curved recess alternate. In the example shown in FIG. 7C, plate-like salients with a uniform width are periodically disposed and recesses with flat bottoms are disposed therebetween.

With the use of a press unit having asperities on a surface adjoining the aggregation, a part of the aggregation lying on the bottom of the container can also be easily doped with an alkali metal. This can suppress the phenomenon in which doping is concentrated in a surface layer of the aggregation.

Figure 8:
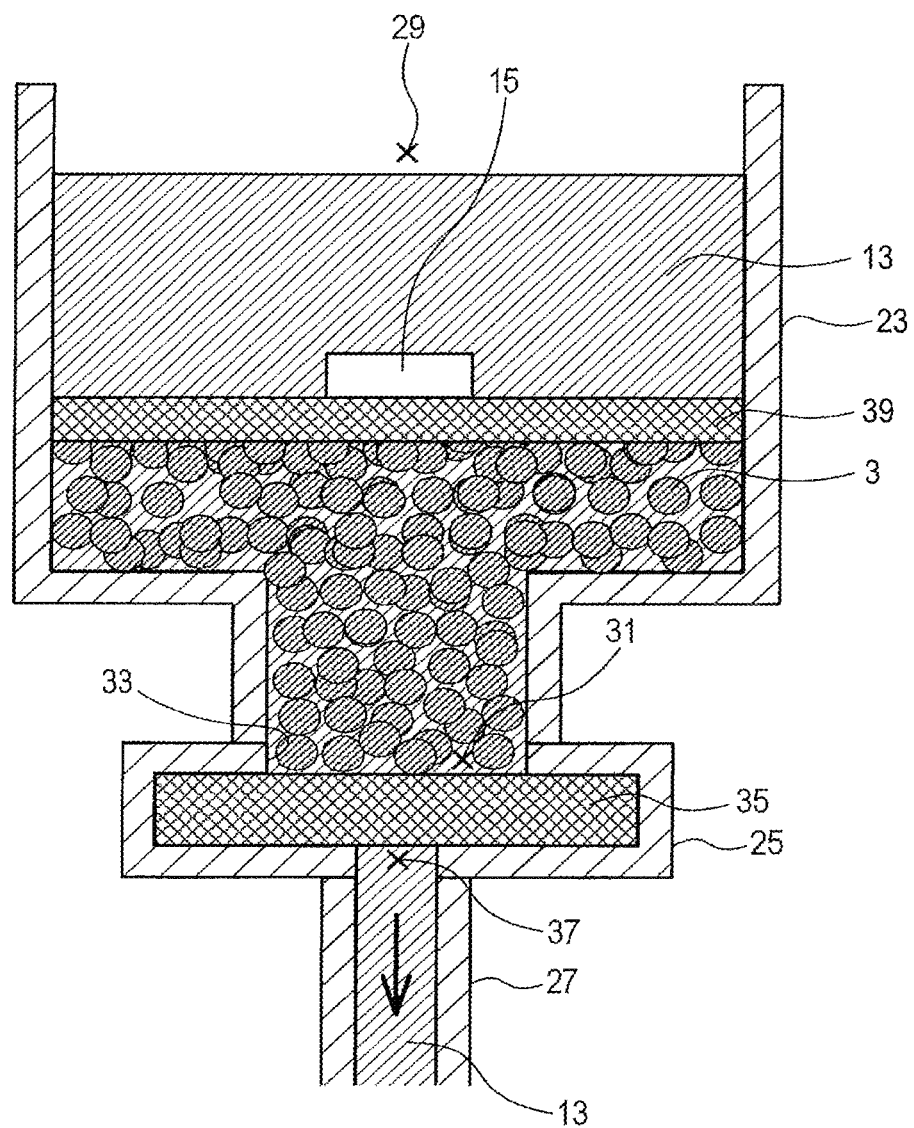
FIG. 8 is a diagram for explaining a method of manufacturing an electrode material.
Figure 9:
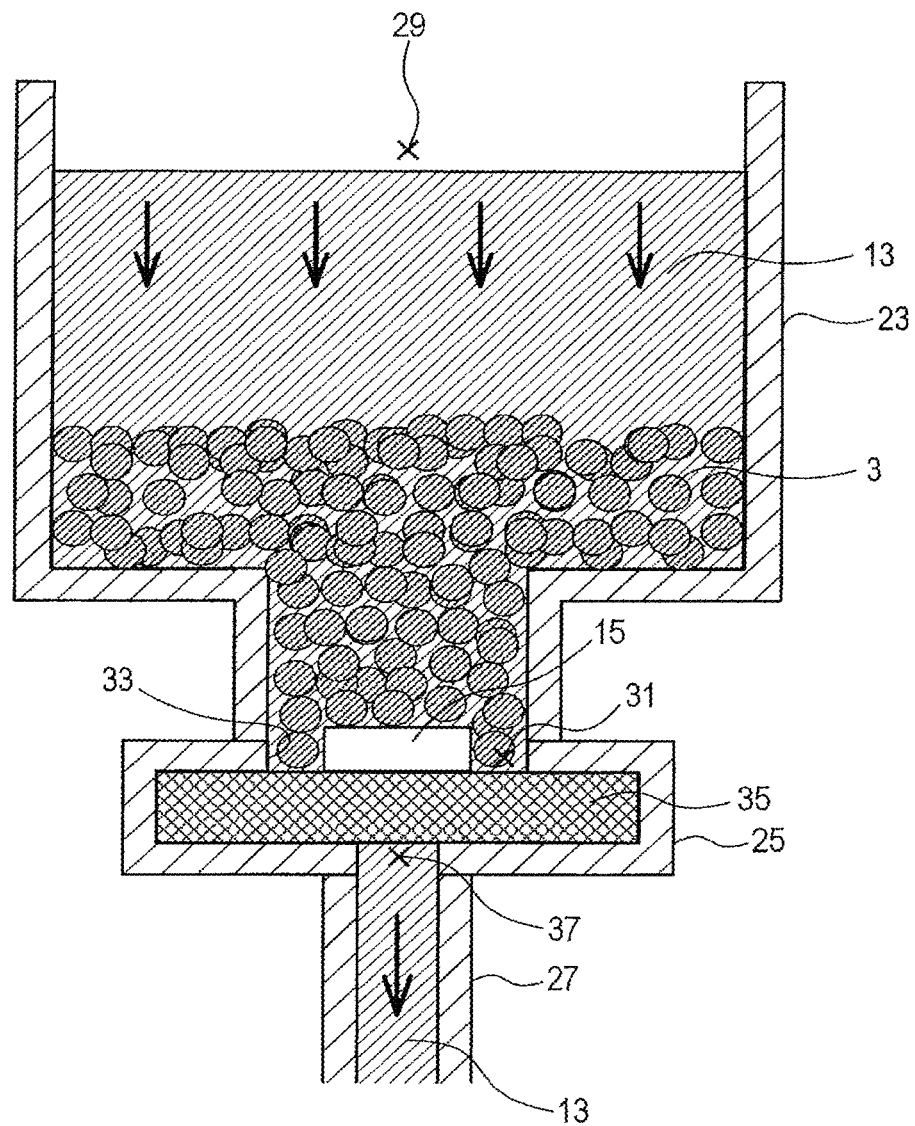
FIG. 9 is a diagram for explaining a method of manufacturing an electrode material.
Figure 10:
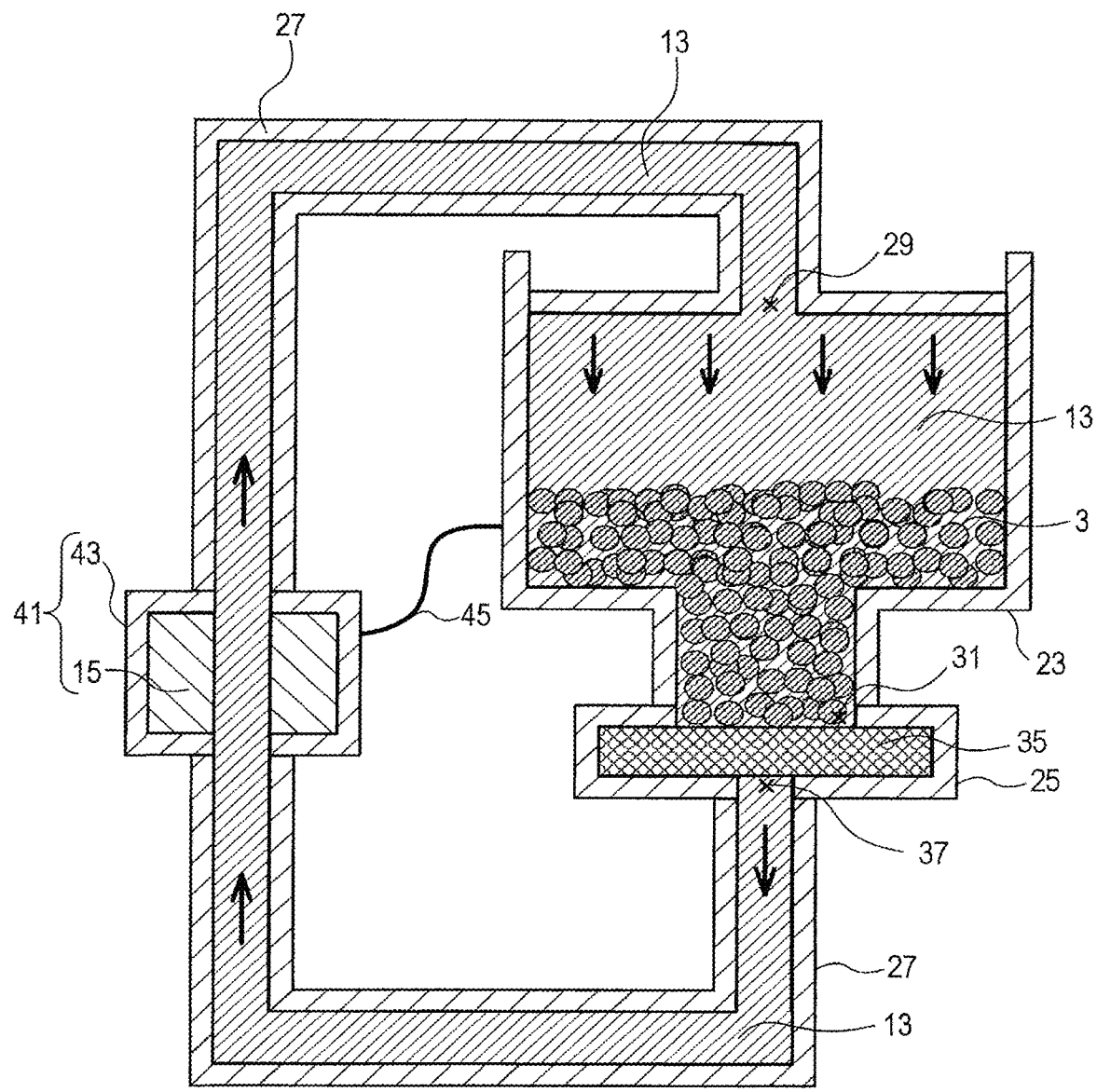
FIG. 10 is a diagram for explaining a method of manufacturing an electrode material.

In another method of statically pressurizing an aggregation in the pressurization step, for example, the aggregation is pressurized through a solvent. To be specific, as shown in FIGS. 8 to 10, a method of pressurizing an aggregation through a solvent involves, for example, establishing a flow of the solvent (e.g., an electrolyte solution 13) passing through the aggregation 3. In this case, the pressure from the solvent is applied to the aggregation 3 from the upstream of the flow of the solvent 13.

To establish a flow of the solvent 13 passing through the aggregation 3, part of the solvent upstream of the aggregation 3 may be pressurized, and part downstream thereof may be depressurized. The solvent 13 may circulate as shown in FIG. 10.

The pressure during pressurization is preferably in the range of 0.001 to 20 MPa. The lower limit of the pressure during pressurization is preferably 0.005 MPa or more, more preferably 0.01 MPa or more. The upper limit of the pressure during pressurization is preferably 10 MPa or less, more preferably 5 MPa or less. If the pressure is within this range, a good balance between the contact resistance between active material particles and diffusion of alkali metal ions can be achieved and doping of the active material with an alkali metal progresses efficiently. Here, pressure refers to gage pressure.

The pressurizing time can be adjusted depending on the type of the active material, the amount of aggregation, the shapes of the container and the press unit, the amount of an alkali metal for doping, and the like.

In the pressurization step, the alkali metal supply and the active material contained in the aggregation should be electrically connected to each other. In the case where the aggregation contains an active material and an alkali metal supply, in the pressurization step, a direct contact between the alkali metal supply and the active material allows them to be electrically connected to each other.

Figure 5:
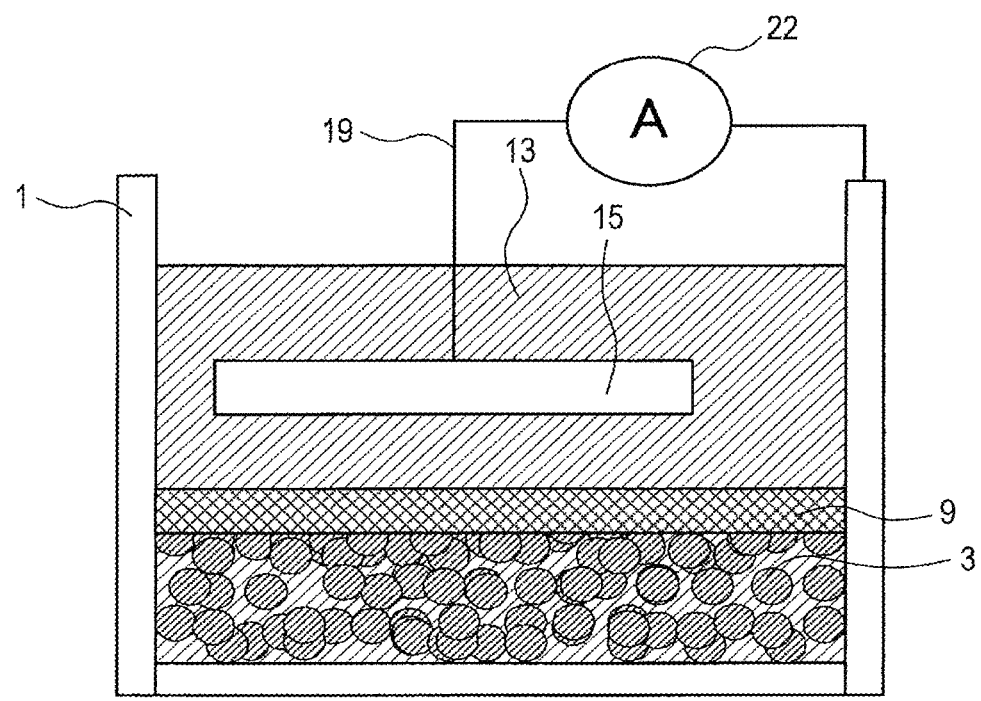
FIG. 5 is a diagram for explaining a method of manufacturing an electrode material.

As shown in FIGS. 2C, 4, and 5, the container 1 containing the aggregation 3 can be used as a conductive member, and an alkali metal supply 15 can be brought in contact with the container 1 to establish a short circuit between the alkali metal supply and the active material so that they can be electrically connected to each other.

Alternatively, a part of the container containing the aggregation can be used as a conductive member, and the alkali metal supply and the active material can be brought in contact with that part to establish a short circuit between the alkali metal supply and the active material so that they can be electrically connected to each other.

Figure 3:
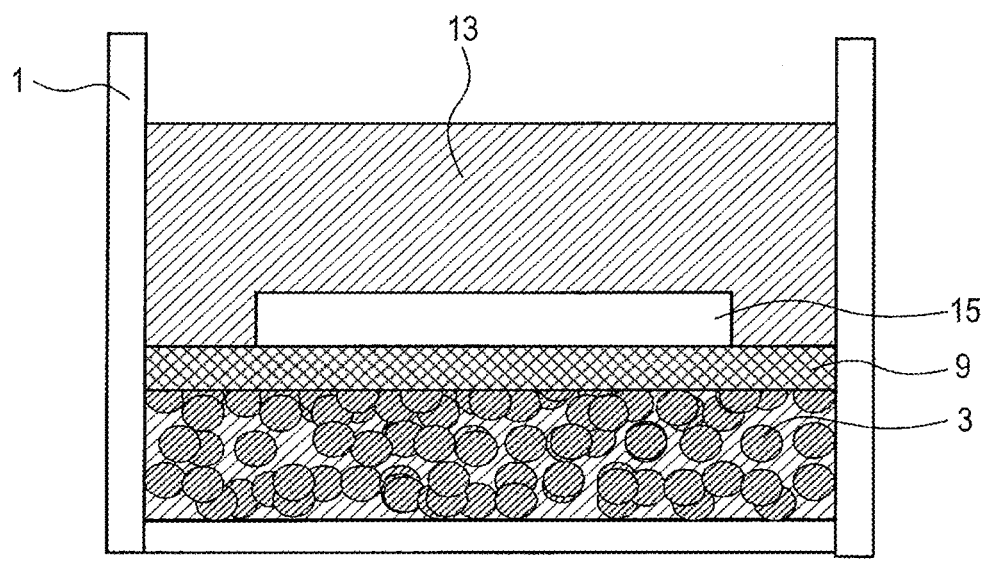
FIG. 3 is a diagram for explaining a method of manufacturing an electrode material.

As shown in FIG. 3, the press unit 9 for pressing the aggregation can be composed of a conductive member, and the alkali metal supply 15 can be brought in contact with the press unit 9 to establish a short circuit between the alkali metal supply and the active material so that they can be electrically connected to each other.

Alternatively, the following manner can be employed. A container containing an aggregation is used as a conductive member. A solvent is introduced into the container. A conductive substrate on which an alkali metal supply is disposed is immersed in the solvent. The plus terminal of a direct current source is connected to the conductive substrate, and the minus terminal of the direct current source is connected to the container. Consequently, the alkali metal supply and the active material are electrically connected to each other. Here, power is provided using the direct current source, so that doping with the alkali metal progresses.

Examples of the material for the conductive member include metals, such as gold, silver, copper, aluminum, iron, nickel, and stainless steel. In the case where the negative electrode active material is doped with an alkali metal, preferred metals are copper, nickel, and stainless steel.

In a method of introducing a solvent in the pressurization step, for example, a solvent and an active material are brought in contact with each other before the initiation of pressurization of an aggregation, and in another method, a solvent and an active material are brought in contact with each other after the initiation of pressurization of an aggregation. The former method has an advantage in that the solvent easily penetrates the overall aggregation. The latter method has an advantage in that the aggregation is not easily diffused. To be specific, the following methods are preferred.

A method in which an aggregation (e.g., a slurry or cake) containing an alkali metal supply, a solvent, and an active material is fabricated, and the fabricated aggregation is pressurized.

A method in which an aggregation (e.g., a slurry or cake) containing a solvent and an active material but not containing an alkali metal supply is fabricated, and the fabricated aggregation and an alkali metal supply in electrical contact with each other are pressurized together.

A method in which, before the initiation of pressurization of an aggregation containing an alkali metal supply, at least part of the aggregation and a solvent are brought in contact with each other and, after the initiation of the pressurization, the solvent is additionally introduced.

A method in which, before the initiation of pressurization of an aggregation not containing an alkali metal supply, at least part of the aggregation and a solvent are brought in contact with each other and, after the initiation of the pressurization of the aggregation, the solvent is additionally introduced and the solvent and the alkali metal supply are brought in contact with each other.

A method in which, before the initiation of pressurization of an aggregation not containing an alkali metal supply, a solvent and an alkali metal supply are brought in contact with each other and, after the initiation of the pressurization of the aggregation, the solvent and the aggregation are brought in contact with each other.

A method in which, after the initiation of pressurization of an aggregation containing an alkali metal supply, a solvent and the aggregation are brought in contact with each other.

A method in which, after the initiation of pressurization of an aggregation not containing an alkali metal supply, a solvent is brought in contact with both the aggregation and an alkali metal supply.

The level of the pressure in the pressurization step may be constant or changed with time. To be specific, a manner of changing the pressure with time is to increase the pressure with time, to reduce the pressure with time, to periodically increase/reduce the pressure, or the like.

In the pressurization step, the temperatures of the solvent and the aggregation are preferably in the range of 20 to 100° C. If the temperatures are in this range, safety is ensured and doping of an active material with an alkali metal progresses efficiently. Since the doping speed tends to rise with increasing temperature, if the doping speed should be increased, the temperatures of the solvent and the aggregation are preferably set to 30° C. or more in the pressurization step. For the environments in the pressurization step, the temperature is preferably in the aforementioned range.

After the pressurization step, the aggregation is preferably stirred in the presence of at least a solvent. After the aggregation is stirred, the pressurization step and stirring may be repeated again. This stirring reduces variations in the degree of doping of the aggregation. During stirring of the aggregation, an alkali metal supply may be either present or absent in the solvent. A stirring operation can be performed using, for example, a device, such as a uniaxial stirrer, a biaxial blender, or a magnetic stirrer, or ultrasound. The stirring time can be adjusted depending on the type of the active material, the amounts of aggregation and solvent, the amount of an alkali metal for doping, and the like.

The following methods A to K are specific examples of a method of manufacturing an electrode material according to this disclosure.

(Method A)

As shown in FIG. 1A, a particulate active material 5 and a particulate alkali metal supply 7 are introduced in the container 1. The particulate active material 5 and the particulate alkali metal supply 7 constitute the aggregation 3. The aggregation 3 is particulate and amorphous.

Next, as shown in FIG. 1B, the aggregation 3 is stirred and the particulate active material 5 and the particulate alkali metal supply 7 are uniformly diffused in the aggregation 3.

Subsequently, after the stirring, as shown in FIG. 1C, the aggregation 3 is pressed toward the inner surface 11 of the container 1 through the press unit 9, thereby statically pressurizing the aggregation 3. At this time, the particulate active material 5 and the particulate alkali metal supply 7 are in direct contact. The press unit 9 is a hard plate having a plurality of through-holes.

Afterwards, as shown in FIG. 1D, an electrolyte solution 13 is introduced in the container 1. The electrolyte solution 13 passes through the press unit 9 having a plurality of through-holes, reaches below the press unit 9, and comes in contact with the aggregation 3 and the particulate alkali metal supply 7, and doping of the particulate active material 5 with an alkali metal starts. At this time, in the presence of the particulate alkali metal supply 7 and the electrolyte solution 13, the amorphous aggregation 3 containing the particulate active material 5 goes into the statically pressurized state.

Subsequently, after doping of the particulate active material 5 with the alkali metal progresses and a predetermined time elapses, the particulate alkali metal supply 7 disappears from the aggregation 3 as shown in FIG. 1E.

Next, as shown in FIG. 1F, the press unit 9 is removed and the aggregation 3 is stirred in the presence of the electrolyte solution 13. At this time, the degree of doping of the aggregation is made uniform. Any known stirring method can be selected as appropriate; for example, as shown in FIG. 1F, a method in which a stirring blade 16 is rotated in the electrolyte solution 13 can be used.

It should be noted that, in the method A, the electrolyte solution 13 and at least part of the aggregation 3 may be brought in contact with each other before the initiation of the pressurization of the aggregation 3; in this case, the electrolyte solution 13 may be additionally introduced after the initiation of the pressurization. The same applies to the following methods B to E. Alternatively, the particulate active material 5 and the particulate alkali metal supply 7 may be uniformly diffused to form the aggregation 3 in anywhere out of the container 1, and the aggregation 3 may then be introduced in the container 1.

(Method B)

As shown in FIG. 2A, the aggregation 3 is introduced in the container 1. The aggregation 3 is particles composed of a particulate active material and is amorphous. The container 1 is a conductive member composed of a metal.

Subsequently, as shown in FIG. 2B, the aggregation 3 is pressed toward the inner surface 11 of the container 1 through the press unit 9, thereby statically pressurizing the aggregation 3. The press unit 9 is a metal conductive member having a plurality of through-holes.

Next, as shown in FIG. 2C, a plate-like alkali metal supply 15 is attached to the inner side surface of the container 1 and the electrolyte solution 13 is introduced into the container 1. The electrolyte solution 13 passes through the press unit 9 having a plurality of through-holes, reaches below the press unit 9, and comes in contact with the aggregation 3. The electrolyte solution 13 also comes in contact with the alkali metal supply 15 attached to the inner side surface of the container 1. At this time, the alkali metal supply 15 and the aggregation 3 in the electrolyte solution 13 are short-circuited through the container 1 and the press unit 9, so that doping of the particulate active material with the alkali metal starts. Further, at this time, in the presence of the alkali metal supply 15 and the electrolyte solution 13, the amorphous aggregation 3 containing the particulate active material goes into the statically pressurized state.

Subsequently, after doping of the particulate active material with the alkali metal progresses and a predetermined time elapses, the alkali metal supply 15 disappears as shown in FIG. 2D.

Next, as shown in FIG. 2E, the press unit 9 is removed and the aggregation 3 is stirred in the presence of the electrolyte solution 13. At this time, the degree of doping of the aggregation is made uniform. Any known stirring method can be selected as appropriate; for example, as shown in FIG. 2E, a method in which the stirring blade 16 is rotated in the electrolyte solution 13 can be used.

It should be noted that, in the method B, before the initiation of the pressurization of the aggregation 3, the electrolyte solution 13 may be introduced into the container 1 approximately until the overall aggregation 3 is almost immersed and, after the initiation of the pressurization, the electrolyte solution 13 may be additionally introduced approximately until the overall alkali metal supply 15 is immersed. The same applies to the following methods C and E.

(Method C)

This method is basically the same as the method B except that, as shown in FIG. 3, a plate-like alkali metal supply 15 is attached to the top surface of the press unit 9. In this case, the alkali metal supply 15 and the aggregation 3 in the electrolyte solution 13 are short-circuited through the press unit 9 and the container 1.

(Method D)

This method is basically the same as the method B except that, as shown in FIG. 4, the aggregation 3 is sandwiched from above and below between a pair of press units 9 and 17 so that the aggregation 3 can be pressurized. The press units 9 and 17 are metal conductive members each having a plurality of through-holes. The plate-like alkali metal supply 15 is attached to the bottom surface of the container 1. In this case, the alkali metal supply 15 and the aggregation 3 in the electrolyte solution 13 are electrically short-circuited through the container 1 and the press units 9 and 17.

(Method E)

This method is basically the same as the method B except that, as shown in FIG. 5, the plate-like alkali metal supply 15 is immersed in the electrolyte solution 13. Further, the alkali metal supply 15 is connected to the container 1 through the conductor 19. An ammeter 22 is provided in the middle of the conductor 19. In this case, the alkali metal supply 15 and the aggregation 3 in the electrolyte solution 13 are electrically short-circuited through the conductor 19, the container 1, and the press unit 9.

When the method E is used, the value of the current flowing through the conductor 19 (hereinafter referred to as short-circuit current) can be monitored by the ammeter 22. The degree of doping of the active material with the alkali metal can be controlled according to the monitored value of the short-circuit current.

(Method F)

As shown in FIG. 8, a cylindrical container 23, which has a larger diameter at the top than at the bottom, a filter housing 25, and a pipe 27 are prepared. The container 23 has a top opening 29 and a bottom opening 31, and the top opening 29 has a larger diameter than the bottom opening 31. The bottom opening 31 is connected to the inlet 33 of the filter housing 25. The filter housing 25 contains a filter 35 that does not allow the aggregation 3 to pass through it but allows the electrolyte solution 13 to pass through it. The outlet 37 of the filter housing 25 is connected to the pipe 27. The container 23, the filter housing 25, and the filter 35 are metal conductive members.

The aggregation 3 is introduced to the container 23 from the opening 29. The aggregation 3 is particles composed of a particulate active material and is amorphous. The aggregation 3 cannot pass through the filter 35 and thus remains in the container 23. Subsequently, the upper surface of the aggregation 3 is covered with a metal plate 39 (hereinafter referred to as a porous metal plate 39) having a plurality of through-holes. The alkali metal supply 15 is attached to the top surface of the porous metal plate 39 so as to partially cover it.

Subsequently, the electrolyte solution 13 is continuously supplied to the container 23 from the opening 29. Afterwards, a part of the container 23 which is upper than the porous metal plate 39 is pressurized or the pipe 27 is depressurized. Consequently, the electrolyte solution 13 that has been supplied from the opening 29 has a flow passing through the porous metal plate 39, the aggregation 3, the filter 35, and the pipe 27 in this order. At this time, the alkali metal supply 15 and the aggregation 3 are short-circuited through the porous metal plate 39, the filter housing 25, and the filter 35, so that doping of the particulate active material with the alkali metal starts.

Further, at this time, a pressure caused by a flow of the electrolyte solution 13 is applied to the aggregation 3 from above (the upstream of the flow). Accordingly, at this time, in the presence of the alkali metal supply 15 and the electrolyte solution 13, the aggregation 3 goes into the statically pressurized state.

Subsequently, after doping of the particulate active material with the alkali metal progresses and a predetermined time elapses, the alkali metal supply 15 disappears.

(Method G)

This method is basically the same as the method F except that, as shown in FIG. 9, the alkali metal supply 15 is placed on the top surface of the filter 35. The alkali metal supply 15 and the aggregation 3 come into direct contact with each other in the electrolyte solution 13, so that doping of the particulate active material with the alkali metal progresses.

(Method H)

This method is basically the same as the method F except that, as shown in FIG. 10, the pipe 27 is connected downstream to the opening 29 of the container 23. Moreover, a porous metal plate is absent on the upper surface of the aggregation 3, and an alkali metal supply holder unit 41, through which the electrolyte solution 13 flows, is provided in the middle of the pipe 27. The alkali metal supply holder unit 41 consists of a housing 43 and a cylindrical alkali metal supply 15 held in it. The electrolyte solution 13 comes into contact with the alkali metal supply 15 while flowing through the holes in it.

The container 23 and the housing 43 are conductive members. In addition, the housing 43 and the container 23 are electrically connected to each other through the conductor 45. Accordingly, the alkali metal supply 15 and the aggregation 3 in the electrolyte solution 13 are short-circuited through the housing 43, the conductor 45, and the container 23.

In the method H, the electrolyte solution 13 that has been supplied to the container 23 and passed through the aggregation 3 and the filter 35 flows through the pipe 27 and returns to the container 23. In other words, the electrolyte solution 13 circulates in a closed system. A circulating pump can be used as a structure for circulating the electrolyte solution 13.

(Method I)

In an electrolyte solution, a particulate alkali metal supply and a particulate active material are stirred to fabricate an aggregation in the form of a slurry or cake in which the particulate alkali metal supply and the particulate active material are uniformly diffused. The fabricated aggregation is, for example, repeatedly blended and left to stand in a pressure kneader. When it is left to stand, in the presence of the particulate alkali metal supply and the electrolyte solution, the amorphous aggregation containing the particulate active material goes into the statically pressurized state. When it is blended and left to stand, the alkali metal supply and the aggregation come into direct contact with each other in the presence of the electrolyte solution, so that doping of the particulate active material with an alkali metal progresses.

(Method J)

Figure 12:
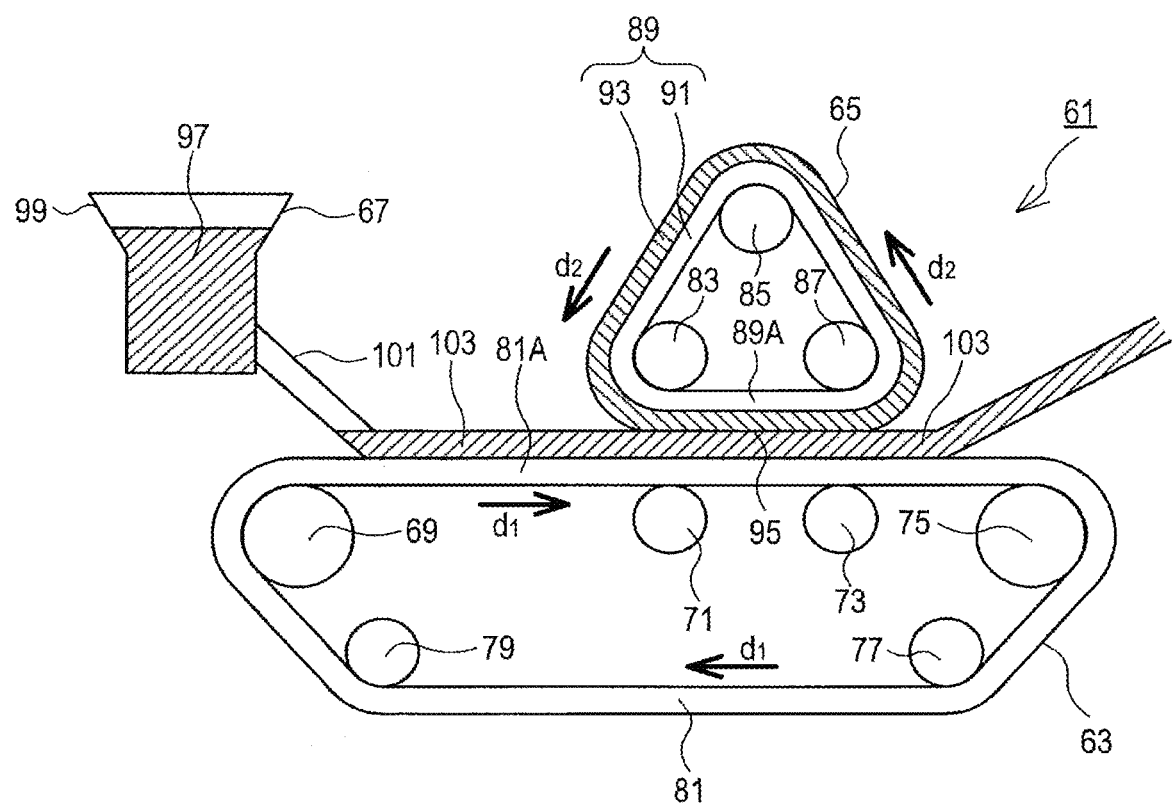
FIG. 12 is a diagram for explaining the structure of a device for continuous doping.

An electrolyte solution and a particulate active material are mixed to fabricate an aggregation in the form of a slurry or cake containing the electrolyte solution and the particulate active material. Next, using, for example, a device 61 shown in FIG. 12, an electrode material is manufactured from the aggregation fabricated in the aforementioned, manner.

The structure of the device 61 will now be described. The device 61 includes a first conveyor belt unit 63, a second conveyor belt unit 65, and an aggregation supply unit 67.

The first conveyor belt unit 63 includes rollers 69, 71, 73, 75, 77, and 79, and a rubber first belt 81 wrapped around them. The rollers 69, 71, 73, 75, 77, and 79 are rotated by a driver not shown in the drawing, and the first belt 81 rotates in the direction $d_1$ shown in FIG. 12. An upper part 81A of the first belt 81 is flat.

The second conveyor belt unit 65 is above the first conveyor belt unit 63. The second conveyor belt unit 65 includes rollers 83, 85, and 87, and a second belt 89 wrapped around them. The second belt 89 has a two-layer structure of an inner layer 91 and an outer layer 93. The inner layer 91 is made of a rubber, and the outer layer 93 is a thin film of an alkali metal.

A lower part 89A of the second belt 89 is flat. The lower part 89A is adjacent to a portion of the upper part 81A which is on the roller 75 side. It should be noted that a portion of the upper part 81A which is on the roller 69 side is not adjacent to the lower part 89A. A portion where the lower part 89A and the upper part 81A are in contact with each other is hereinafter referred to as a contact portion 95.

A downward pressing power is applied to the second conveyor belt unit 65 through a pressure mechanism not shown in the drawing. Thus, the contact portion 95 is pressurized from above and below. When the first belt 81 rotates in the direction $d_1$, this rotation force causes the second belt 89 to rotate in the direction $d_2$ shown in FIG. 12.

The aggregation supply unit 67 includes a container 99 that can contain an aggregation 97 in the form of a slurry or cake, and a nozzle 101 that supplies the aggregation 97 from the container 99 onto the upper part 81A. The nozzle 101 supplies the aggregation 97 to a portion of the upper part 81A which is closer to the roller 69 than the contact portion 95. The nozzle 101 supplies the aggregation 97 in such a manner that the aggregation 97 spreads with a uniform thickness in the width direction of the upper part 81A (in the direction orthogonal to the paper plane in FIG. 12).

A method of manufacturing an electrode material using this device 61 will now be explained. First, the aggregation 97 is introduced to the container 99. Further, the first belt 81 is rotated in the direction $d_1$ at a constant speed. At this time, with the rotation of the first belt 81, the second belt 89 also rotates in the direction $d_2$ at a constant speed.

Next, the nozzle 101 supplies the aggregation 97 onto the first belt 81 at a constant supply speed. Since the first belt 81 is rotating at a constant speed, an aggregation layer 103 of the aggregation 97 is continuously formed on the first belt 81. The thickness of the aggregation layer 103 is preferably in the range of 20 µm to 5 mm. Within this range, the doping speed of doping with an alkali metal described later further increases. The thickness of the aggregation layer 103 becomes thinner as the rotation speed of the first belt 81 is increased. Further, the thickness of the aggregation layer 103 becomes thinner as the supply speed of the aggregation 97 from the nozzle 101 is decreased.

The aggregation layer 103 moves in the direction $d_1$ at a constant speed and is pressurized from above and below between the first belt 81 and the second belt 89 when passing through the contact portion 95. When pressurized therebetween, the aggregation layer 103 comes into contact with the outer layer 93 composed of the alkali metal. Further, when pressurized therebetween, the aggregation layer 103 is not solidified yet and has flowability.

When the aggregation layer 103 is in the contact portion 95, the aggregation layer 103 and the alkali metal constituting the outer layer 93 are continuously in direct contact with each other in the presence of the electrolyte solution, so that doping of the particulate active material contained in the aggregation layer 103 with the alkali metal progresses.

After passing through the contact portion 95, the aggregation layer 103 is taken out by a takeoff mechanism not shown in the drawing.

It should be noted that a porous member dampened with the electrolyte solution may be disposed between the outer layer 93 and the inner layer 91. In this case, the doping speed further increases.

The aggregation layer 103 and the outer layer 93 may be overlapped each other with a porous metal plate therebetween. In this case, the doping speed further increases.

Particles or small pieces of the alkali metal supply may be put in the aggregation 97 in advance. At this time, the aggregation layer 103 contains particles or small pieces of the alkali metal supply. In this case, the outer layer 93 is not necessarily needed.

(Method K)

As shown in FIG. 13A, the particulate active material 5, the particulate alkali metal supply 7, and the electrolyte solution 13 are introduced in the container 1. The particulate active material 5 and the particulate alkali metal supply 7 constitute the aggregation 3. The aggregation 3 is particulate and amorphous.

Next, as shown in FIG. 13B, the particulate active material 5, the particulate alkali metal supply 7, and the electrolyte solution 13 are stirred in such a manner that the particulate active material 5 and the particulate alkali metal supply 7 are uniformly diffused in the electrolyte solution 13, so that the amorphous aggregation 3 in a slurry is obtained. The aggregation 3 is particulate and amorphous. Any known stirring method can be selected as appropriate and, as shown in FIG. 13B, a method in which the stirring blade 16 is rotated in the electrolyte solution 13 can be used, for example.

After doping of the particulate active material 5 with the alkali metal progresses with stirring and a predetermined time elapses, the particulate alkali metal supply 7 contained in the aggregation 3 decreases.

Subsequently, after the stirring, as shown in FIG. 13C, the aggregation 3 is pressed toward the inner surface 11 of the container 1 through the press unit 9, thereby statically pressurizing the aggregation 3. At this time, the particulate active material 5 and the particulate alkali metal supply 7 are in direct contact. The press unit 9 is a hard plate having a plurality of through-holes.

After, in the state where the aggregation 3 is pressed by the press unit 9, doping of the particulate active material 5 with the alkali metal progresses and a predetermined time elapses, the particulate alkali metal supply 7 is no longer contained in the aggregation 3.

Next, as shown in FIG. 13D, the press unit 9 is removed and the aggregation 3 is stirred in the presence of the electrolyte solution 13. At this time, the degree of doping of the aggregation 3 is made uniform. Any known stirring method can be selected as appropriate and, as shown in FIG. 13D, a method in which the stirring blade 16 is rotated in the electrolyte solution 13 can be used, for example. The aggregation 3 may be stirred and pressurized once as described above; alternatively, it may be stirred and pressurized as described above and then be further stirred and pressurized repeatedly. Repetition of stirring and pressurization allows the degree of doping to be more uniform.

It should be noted that, after the press unit 9 is removed, the electrolyte solution 13 may be added to the container 1. Further, during pressurization by the press unit 9, the electrolyte solution 13 may be added to the container 1.

The elements in the methods A to K may be partly combined as appropriate. For example, in the methods A and K, the aggregation 3 may be pressurized using the press units 9 and 17 like in the method D. Further, in the method D, like in the method B, the plate-like alkali metal supply 15 may be attached to the top surface of the press unit 9 or the bottom surface of the press unit 17. Further, in the method E, the aggregation 3 may be pressurized using the press units 9 and 17 like in the method D. Further, in the method G, the electrolyte solution 13 may be circulated like in the method H.

The aggregation obtained in the pressurization step as it is may be regarded as a product of the method of manufacturing an electrode material according to this disclosure. The aggregation which is obtained in the pressurization step and from which a predetermined component (a component other than the active material, e.g., the residue of the alkali metal supply) is removed may be regarded as a product of the method of manufacturing an electrode material according to this disclosure. The aggregation which is obtained in the pressurization step and to which a predetermined component is added may be regarded as a product of the method of manufacturing an electrode material according to this disclosure.

2. Electrode

Although the electrode used may be either a positive electrode or negative electrode, a negative electrode is preferably used because a method of manufacturing an electrode material according to this disclosure is suitable for doping of a negative electrode active material with an alkali metal. For example, an electrode includes a charge collector and an electrode material layer disposed on a surface thereof. The electrode material layer contains an electrode material (an active material doped with an alkali metal) manufactured by the manufacturing method described in the chapter of "Method of manufacturing electrode material".

When a negative electrode is manufactured, the charge collector is preferably, for example, a foil of a metal, such as copper, nickel, or stainless steel. Alternatively, the charge collector may consist of the metal foil on which a conductive layer mainly composed of a carbon material is formed. The thickness of the charge collector may be, for example, 5 to 50 μm.

The electrode material layer may contain, for example, a binder, an organic solvent, or the like in addition to an electrode material. Examples of the binder include, rubber-based binders such as styrene-butadiene rubber (SBR) and NBR; fluorine-based resins such as polytetrafluoroethylene and polyvinylidene fluoride; polypropylene, polyethylene, and a fluorine-modified (meth)acrylic binder disclosed in Japanese Patent Laid-Open No. 2009-246137. The organic solvent may be the same as the organic solvent described in the chapter of "Method of manufacturing electrode material".

The thickness of the electrode material layer, which is not limited to a particular value, is, for example, in the range of 5 to 500 μm, preferably 10 to 200 μm, more preferably 10 to 100 μm.

The electrode material layer can be fabricated by, for example, preparing a slurry containing an electrode material, a binder, an organic solvent, and the like, applying this slurry onto the charge collector, and drying it.

The slurry may contain other components in addition to an electrode material, a binder, and an organic solvent. Examples of the other components include conductive agents, such as carbon black, graphite, vapor-grown carbon fiber, and metal particles; and thickening agents, such as carboxymethyl cellulose, Na salt or ammonium salt thereof, methyl cellulose, hydroxymethyl cellulose, ethyl cellulose, hydroxypropyl cellulose, polyvinyl alcohol, oxidized starch, phosphorylated starch, and casein.

Alternatively, as disclosed in Japanese Patent Laid-Open No. 2004-281162, for example, an electrode containing a gel electrolyte can be prepared by using a gelling agent as a binder and adding an electrolyte to the slurry.

An electrode of this disclosure has a small irreversible capacitance. In a cell or capacitor including an electrode of this disclosure, decomposition of the electrolyte solution on the electrode is suppressed.

3. Capacitor

The capacitor includes a positive electrode, a negative electrode, and an electrolyte, and the negative electrode has been described in the chapter of "Electrode". The capacitor can be any capacitor that uses insertion/removal of alkali metal ions, for example, a lithium ion capacitor, a sodium ion capacitor, or the like. Among these, a lithium ion capacitor is the most preferable.

Although the basic structure of a positive electrode in the capacitor is the same as that of the electrode described in the chapter of "Electrode", the positive electrode active material is preferably activated carbon.

The electrolyte is generally in liquid form and may be the same as that in the electrolyte solution described in the chapter of "Method of manufacturing electrode material". The electrolyte may be in gel or solid form to avoid liquid leakage.

The capacitor may include a separator between the positive electrode and the negative electrode so that a physical contact therebetween can be suppressed. Examples of the separator include nonwoven fabric or porous films made from cellulose rayon, polyethylene, polypropylene, polyamide, polyester, polyimide, or the like.

The structure of the capacitor is, for example, a laminated cell in which a laminate of three or more plate-like structural units each consisting of a positive electrode, a negative electrode, and a separator therebetween is encapsulated in an exterior film.

Alternatively, the structure of the capacitor is, for example, a wound cell in which a laminate of strip-shaped structural units each consisting of a positive electrode, a negative electrode, and a separator therebetween, which are wound is contained in a cornered or cylindrical container.

In a capacitor of this disclosure including an electrode of this disclosure as its negative electrode, decomposition of the electrolyte solution on the negative electrode is suppressed, so that a smaller amount of gas is generated when it is held in the charge status.

4. Cell

A cell of this disclosure includes a positive electrode, a negative electrode, and an electrolyte, and the negative electrode has been described in the chapter of "Electrode". The cell may be any cell that involves insertion/removal of alkali metal ions and may be either a non-rechargeable cell or rechargeable cell. Examples of the cell include lithium ion rechargeable cells, sodium ion rechargeable cells, and air cells. Among these, a lithium ion rechargeable cell is the most preferable.

Although the basic structure of a positive electrode in the cell of this disclosure is the same as that of the electrode described in the chapter of "Electrode", the positive electrode active material can be a material other than those illustrated above; for example, an organic active material, such as nitroxy radical compound, or oxygen.

The structure of an electrolyte in a cell of this disclosure and the structure of the cell itself are the same as those described in aforementioned "Capacitor".

A cell of this disclosure includes a negative electrode having a small irreversible capacitance, and thus exhibits high energy density and excellent cycle characteristics.

5. Manufacturing Device

A manufacturing device of this disclosure includes (A) a container containing an alkali metal supply, a solvent, and an amorphous aggregation containing at least an active material, and (B) a pressure unit for pressurizing the aggregation, and is used to manufacture an electrode material.

The container can be any container that can contain the aforementioned (A). The container may be, for example, any of the containers 1 shown in FIGS. 1A to 1F, FIGS. 2A to 2E, FIGS. 3 to 6, and FIGS. 13A to 13D. The container is preferably a conductive member. If the container is a conductive member, the alkali metal supply and the aggregation can be short-circuited through the container.

The pressure unit may be the press unit described in the chapter of "Method of manufacturing electrode material". The press unit may be either connected to the container or separated from the container.

The pressure unit may be a unit in which the aggregation is pressurized through a solvent. To be specific, the pressure unit may be a unit in which a flow of the solvent passing through the aggregation is established and the flow of the solvent pressurizes the aggregation. A unit in which an aggregation is pressurized through a solvent can be composed of, for example, a path of the solvent passing through the aggregation, and a unit (e.g., a pump) allowing the solvent to flow along the path.

A manufacturing device of this disclosure may include the conductor 19 and ammeter 22 shown in FIG. 5 and a stirring device (e.g., the stirring blade 16 shown in FIGS. 1F and 2E) for stirring the material in the container.

In addition, a manufacturing device of this disclosure may include, as needed, a mechanism for controlling the temperature in the container, a mechanism for controlling the pressure in the container, and a mechanism for controlling the atmosphere gas in the container.

The details of the embodiments of the present disclosure will now be further described with reference to examples. It should be noted that this disclosure is not limited to the following examples. It should be noted that the following examples and comparative examples were conducted in a dry room at a controlled temperature of 25° C. and a controlled dew point in the range of −50 to −60° C.

Example 1

(1) Doping of Particulate Graphite with Lithium

Figure 11A:
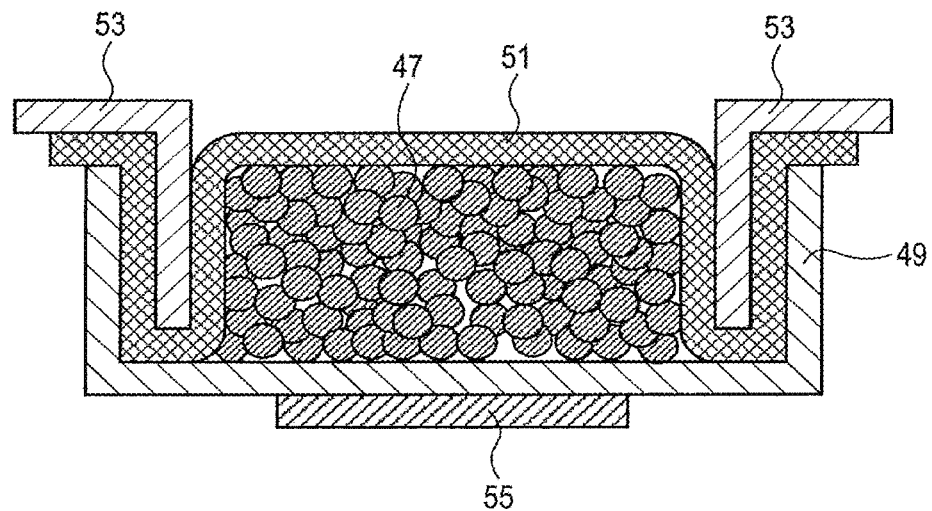
FIG. 11A is a cross-sectional view showing the configurations of an aggregation, a stainless steel container, a lithium metal piece, and the like, and FIG. 11B is a diagram for explaining the state where the stainless steel container is contained in a polypropylene container and an electrolyte solution is introduced in it.

As shown in FIG. 11A, an aggregation (hereinafter referred to as aggregation 47) of 360 mg of particulate graphite (a negative electrode active material, 50% volume cumulative diameter D50=20 μm) that has been vacuum-dried for six hours was introduced into a stainless steel container 49 (inner diameter: 20 mm, height: 2.5 mm) opened at the top.

Subsequently, the opening of the stainless steel container 49 was covered with a 15-μm-thick hole-punched copper foil 51 having multiple through-holes having a diameter of 10 μm or less. A 1-mm-wide outer portion of the hole-punched copper foil 51 was then held down with a polypropylene ring 53 to fix the hole-punched copper foil 51 to the stainless steel container 49.

Consequently, the aggregation 47 was sandwiched between the stainless steel container 49 and the hole-punched copper foil 51. At this time, the stainless steel container 49 and the hole-punched copper foil 51 were in contact, and a pressure of 0.3 MPa was applied to the aggregation 47 from the hole-punched copper foil 51. It should be noted that this pressure was measured by inserting pressure-sensitive paper between the aggregation 47 and the hole-punched copper foil 51.

The state where the aggregation 47 is pressurized is maintained until the aggregation 47 is taken out of the stainless steel container 49. The stainless steel container 49 and the hole-punched copper foil 51 correspond to press units.

Next, a lithium metal piece 55 (with a purity of 99% or more) that is 100 μm in thickness and 17.5 mg in weight was bonded to the bottom outer surface of the stainless steel container 49. The lithium metal piece 55 is in contact with the stainless steel container 49.

Figure 11B:
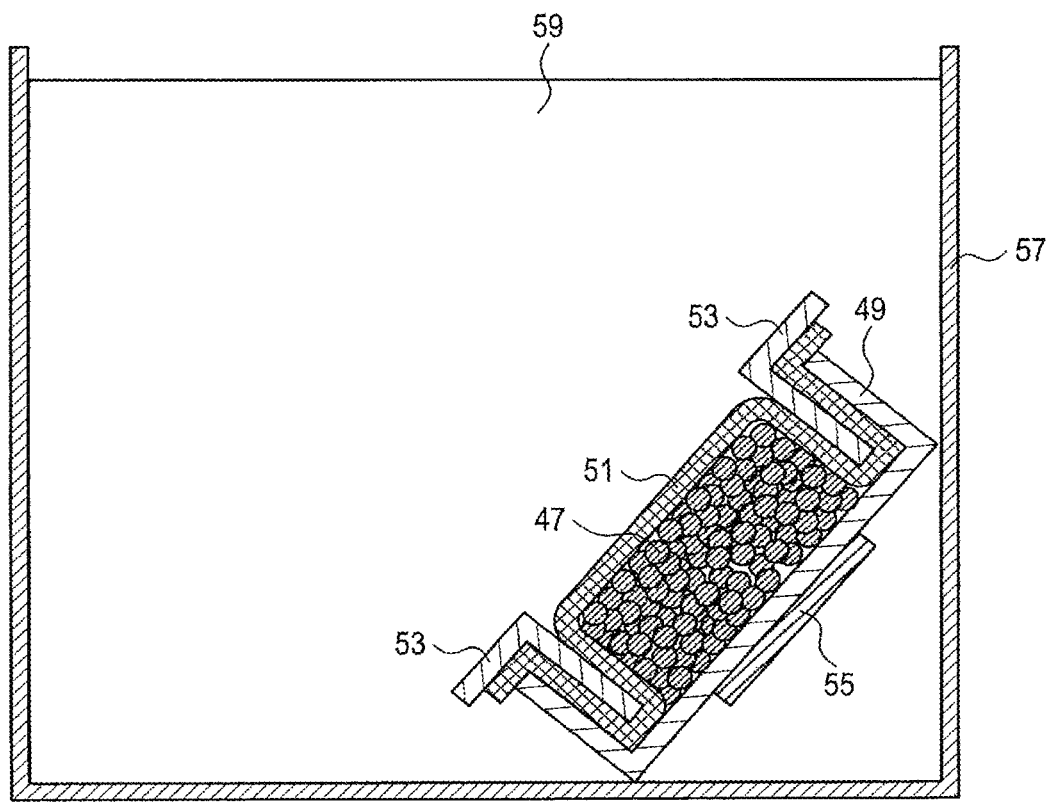

Next, as shown in FIG. 11B, the stainless steel container 49 was put in a polypropylene container 57. At this time, the stainless steel container 49 was set against a side surface of the polypropylene container 57. In particular, one end of the stainless steel container 49 was brought in contact with the side surface of the polypropylene container 57 and the other end was brought in contact with the bottom surface of the polypropylene container 57. Further, the lithium metal piece 55 was set below the stainless steel container 49.

Subsequently, as shown in FIG. 11B, an electrolyte solution 59 was introduced into the polypropylene container 57. The electrolyte solution 59 is a solution which was prepared by dissolving $LiPF_6$ (1.0 M) in a solvent of ethylene carbonate and methyl ethyl carbonate mixed in a volume ratio of 3:7.

The amount of the electrolyte solution 59 to introduce was set to such an amount that the entire stainless steel container 49 can be immersed. The electrolyte solution 59 entered the stainless steel container 49 through the through-holes in the hole-punched copper foil 51. At this time, lithium from the lithium metal piece 55 and the active material contained in the aggregation 47 were electrically connected to each other, the electrolyte solution 59 and the active material contained in the aggregation 47 were in contact with each other, and the lithium metal piece 55 and the electrolyte solution 59 were in contact with each other.

Next, a stir bar was put in the electrolyte solution 59 and was rotated using a magnetic stirrer at 350 rpm, thereby stirring the electrolyte solution 59. Consequently, the lithium metal piece 55 disappeared in 72 hours from the initiation of stirring. Next, the stainless steel container 49 was taken out of the polypropylene container 57, and the aggregation 47 was taken out of the stainless steel container 49.

(2) Evaluation of Particulate Graphite

A bag serving as a part of an electrode for evaluation was manufactured in the following manner. First, two 16-mm φ-hole-punched copper foils were prepared by the blanking method. Next, the two hole-punched copper foils were overlapped with each other and their outer portions except one opening were ultrasonic-welded, thereby forming the bag.

Subsequently, 30 mg (graphite conversion) of the aggregation 47 taken out of the stainless steel container 49 was put in the bag formed in the aforementioned manner. The opening of the bag was ultrasonic-welded, thereby completing an electrode for evaluation.

Afterwards, a three-electrode cell was assembled from the electrode for evaluation fabricated in the aforementioned manner and serving as a working electrode, and a lithium metal serving as a counter electrode and a reference electrode. An electrolyte solution having the same composition as the electrolyte solution 59 was injected to this three-electrode cell. The potential of the working electrode with respect to the lithium metal just after the injection was then measured. The measurement results showed that the potential of the working electrode was 80 mV.

Since the potential of graphite not doped with lithium is about 3 V with respect to the lithium metal, the above processing verified that the particulate graphite has been doped with lithium.

Example 2

(1) Doping of Particulate Graphite with Lithium

Basically in the same manner as in Example 1, particulate graphite was doped with lithium. However, in this example, a lithium metal piece was not bonded to the outer surface of the stainless steel container 49 but was introduced into the stainless steel container 49 together with the particulate graphite. To be specific, the following manner was used.

An aggregation 47 of 360 mg of particulate graphite (a negative electrode active material, 50% volume cumulative diameter D50=20 μm) that has been vacuum-dried for six hours, and lithium metal pieces were introduced into a stainless steel container 49 (inner diameter: 20 mm, height: 2.5 mm) opened at the top. The lithium metal pieces are four pieces into which a lithium metal plate that is 100 μm in thickness and 17.5 mg in weight is cut. The lithium metal pieces were disposed as uniformly as possible in the aggregation 47.

Subsequently, the opening of the stainless steel container 49 was covered with a 15-μm-thick hole-punched copper foil 51 having multiple through-holes having a diameter of 10 μm or less. A 1-mm-wide outer portion of the hole-punched copper foil 51 was then held down with a polypropylene ring 53 to fix the hole-punched copper foil 51 to the stainless steel container 49.

Consequently, the aggregation 47 and the lithium metal pieces were sandwiched between the stainless steel container 49 and the hole-punched copper foil 51. At this time, the stainless steel container 49 and the hole-punched copper foil 51 were in contact, and a pressure of 0.3 MPa was applied to the aggregation 47 from the hole-punched copper foil 51. It should be noted that this pressure was measured by inserting pressure-sensitive paper between the aggregation 47 and the hole-punched copper foil 51.

The state where the aggregation 47 is pressurized is maintained until the aggregation 47 is taken out of the stainless steel container 49. The stainless steel container 49 and the hole-punched copper foil 51 correspond to press units.

Next, the stainless steel container 49 was put in a polypropylene container 57. At this time, the stainless steel container 49 was set against a side surface of the polypropylene container 57. In particular, one end of the stainless steel container 49 was brought in contact with the side surface of the polypropylene container 57 and the other end was brought in contact with the bottom surface of the polypropylene container 57.

Subsequently, an electrolyte solution 59 was introduced into the polypropylene container 57. The electrolyte solution 59 is a solution which was prepared by dissolving $LiPF_6$ (1.0 M) in a solvent of ethylene carbonate and methyl ethyl carbonate mixed in a volume ratio of 3:7.

The amount of the electrolyte solution 59 to introduce was set to such an amount that the entire stainless steel container 49 can be immersed. The electrolyte solution 59 entered the stainless steel container 49 through the through-holes in the hole-punched copper foil 51. At this time, lithium from the lithium metal piece and the active material contained in the aggregation 47 were electrically connected to each other, the electrolyte solution 59 and the active material contained in the aggregation 47 were in contact with each other, and the lithium metal piece and the electrolyte solution 59 were in contact with each other.

Next, a stir bar was put in the electrolyte solution 59 and was rotated using a magnetic stirrer at 350 rpm, thereby stirring the electrolyte solution 59. Consequently, the lithium metal piece disappeared in 72 hours from the initiation of stirring. Next, the stainless steel container 49 was taken out of the polypropylene container 57, and the aggregation 47 was taken out of the stainless steel container 49.

(2) Evaluation of Particulate Graphite

As in Example 1, an electrode for evaluation was fabricated using the aggregation 47 taken out of the stainless steel container 49, and a three-electrode cell was assembled using the electrode for evaluation. The measurement of the potential of the working electrode showed that the potential of the working electrode was 80 mV.

Since the potential of graphite not doped with lithium is about 3 V with respect to the lithium metal, the above processing verified that the particulate graphite has been doped with lithium.

Example 3

(1) Doping of Particulate Graphite with Lithium

Basically in the same manner as in Example 1, particulate graphite was doped with lithium. However, in this example, a lithium metal piece was not bonded to the outer surface of the stainless steel container 49 but was bonded to the inner bottom surface of the stainless steel container 49. To be specific, the following manner was used.

The lithium metal piece was introduced into the stainless steel container 49 (inner diameter: 20 mm, height: 2.5 mm) opened at the top, and was bonded to the bottom surface of the stainless steel container 49. This lithium metal piece is 100 μm in thickness and 17.5 mg in weight.

Next, an aggregation 47 of 360 mg of particulate graphite (a negative electrode active material, 50% volume cumulative diameter D50=20 μm) that has been vacuum-dried for six hours was introduced into the stainless steel container 49.

Subsequently, the opening of the stainless steel container 49 was covered with a 15-μm-thick hole-punched copper foil 51 having multiple through-holes having a diameter of 10 μm or less. A 1-mm-wide outer portion of the hole-punched copper foil 51 was then held down with a polypropylene ring 53 to fix the hole-punched copper foil 51 to the stainless steel container 49.

Consequently, the aggregation 47 and the lithium metal piece were sandwiched between the stainless steel container 49 and the hole-punched copper foil 51. At this time, the stainless steel container 49 and the hole-punched copper foil 51 were in contact, and a pressure of 0.3 MPa was applied to the aggregation 47 from the hole-punched copper foil 51. It should be noted that this pressure was measured by inserting pressure-sensitive paper between the aggregation 47 and the hole-punched copper foil 51.

The state where the aggregation 47 is pressurized is maintained until the aggregation 47 is taken out of the stainless steel container 49. The stainless steel container 49 and the hole-punched copper foil 51 correspond to press units.

Next, the stainless steel container 49 was put in a polypropylene container 57. At this time, the stainless steel container 49 was set against a side surface of the polypropylene container 57. In particular, one end of the stainless steel container 49 was brought in contact with the side surface of the polypropylene container 57 and the other end was brought in contact with the bottom surface of the polypropylene container 57.

Subsequently, an electrolyte solution 59 was introduced into the polypropylene container 57. The electrolyte solution 59 is a solution which was prepared by dissolving $LiPF_6$ (1.0 M) in a solvent of ethylene carbonate and methyl ethyl carbonate mixed in a volume ratio of 3:7.

The amount of the electrolyte solution 59 to introduce was set to such an amount that the entire stainless steel container 49 can be immersed. The electrolyte solution 59 entered the stainless steel container 49 through the through-holes in the hole-punched copper foil 51. At this time, lithium from the lithium metal piece and the active material contained in the aggregation 47 were electrically connected to each other, the electrolyte solution 59 and the active material contained in the aggregation 47 were in contact with each other, and the lithium metal piece and the electrolyte solution 59 were in contact with each other.

Next, a stir bar was put in the electrolyte solution 59 and was rotated using a magnetic stirrer at 350 rpm, thereby stirring the electrolyte solution 59. Consequently, the lithium metal piece disappeared in 96 hours from the initiation of stirring. Next, the stainless steel container 49 was taken out of the polypropylene container 57, and the aggregation 47 was taken out of the stainless steel container 49.

(2) Evaluation of Particulate Graphite

As in Example 1, an electrode for evaluation was fabricated using the aggregation 47 taken out of the stainless steel container 49, and a three-electrode cell was assembled using the electrode for evaluation. The measurement of the potential of the working electrode showed that the potential of the working electrode was 85 mV.

Since the potential of graphite not doped with lithium is about 3 V with respect to the lithium metal, the above processing verified that the particulate graphite has been doped with lithium.

Example 4

Particulate graphite (360 mg) that has been vacuum-dried for six hours was mixed with an electrolyte solution (360 mg), thereby fabricating an aggregation in a slurry. The particulate graphite and the electrolyte solution used are the same as in Example 1. A copper foil was spread over a glass substrate, and the fabricated slurry was provided over the copper foil to fabricate a slurry layer having a thickness of about 1 mm by using an applicator bar. The slurry layer consists of the aggregation.

A hole-punched copper foil, a lithium metal piece (thickness: 100 μm, weight: 17.5 mg), filter paper immersed in an electrolyte solution, and a glass substrate were stacked in this order on the fabricated slurry layer, thereby forming a laminate. Next, an outer portion of the laminate was sealed with a polyimide tape. A weight was placed on the glass substrate to apply a pressure of 0.01 MPa to the aggregation. Consequently, the lithium metal piece disappeared in 48 hours from the initiation of pressurization.

Example 5

(1) Doping of Particulate Graphite with Lithium

Particulate graphite (360 mg) that has been vacuum-dried for six hours was mixed with an electrolyte solution (360 mg), thereby fabricating a slurry. The particulate graphite and the electrolyte solution used are the same as in Example 1. The fabricated slurry and lithium metal pieces were introduced into a cylindrical stainless steel container (inner diameter: 20 mm) having a glass filter (filter diameter: 1 μm or less) in its lower portion. Next, the same glass filter was also attached to the upper portion of the stainless steel container. The lithium metal pieces are four pieces into which a lithium metal plate that is 100 μm in thickness and 17.5 mg in weight is cut. The lithium metal pieces were disposed as uniformly as possible in the aggregation.

Next, the electrolyte solution (36 g) was introduced into the stainless steel container and pressurized by air at 0.2 Mpa blew from above the stainless steel container, thereby forming a flow of the electrolyte solution passing through the aggregation. The electrolyte solution passing through the aggregation and flowing out from the lower portion of the stainless steel container was temporarily held in a container and then brought up using a pump to be returned to the stainless steel container. In this manner, air at 0.2 Mpa was introduced for pressurization while the electrolyte solution was circulated; consequently, the lithium metal pieces disappeared after 60 hours from the initiation of the pressurization.

(2) Evaluation of Particulate Graphite

As in Example 1, an electrode for evaluation was fabricated using the aggregation taken out of the stainless steel container, and a three-electrode cell was assembled using the electrode for evaluation. The measurement of the potential of the working electrode showed that the potential of the working electrode was 80 mV.

Example 6

Particulate graphite (360 mg) that has been vacuum-dried for six hours, an electrolyte solution (360 mg), and a lithium metal piece (17.5 mg) were introduced into a stainless steel container and were subjected six times to a step of blending and mixing them for 10 minutes at 30 rpm using a hand mixer, thereby providing a slurry. This slurry corresponds to an aggregation. The particulate graphite, the electrolyte solution, and the lithium metal piece used are the same as in Example 1.

Next, a weight was placed on the aggregation in a slurry from above the stainless steel container for pressurization, thereby applying a pressure of 0.1 MPa to the slurry layer. Consequently, the lithium metal piece in the slurry layer disappeared in 48 hours from the initiation of pressurization.

Comparative Example 1

Particulate graphite (360 mg) (a negative electrode active material, 50% volume cumulative diameter D50=20 μm) that has been vacuum-dried for six hours was introduced into a polypropylene container. Next, a copper foil (30 mm×30 mm×18 μm) with a lithium metal piece (with a purity of 99% or more) that is 100 μm in thickness and 17.5 mg in weight and is bonded to the center of the copper foil was prepared, and the copper foil was disposed in the polypropylene container. At this time, the main surface of the copper foil was set vertical to the bottom surface of the container. Subsequently, an electrolyte solution was introduced into the polypropylene container. The electrolyte solution is the same as in Example 1. The amount of the electrolyte solution to introduce was set to such an amount that the entire copper foil can be immersed.

Next, a stir bar was put in the polypropylene container and was rotated using a magnetic stirrer at 350 rpm, thereby stirring the electrolyte solution. The lithium metal piece bonded to the copper foil remained even after 144 hours from the initiation of stirring.

Comparative Example 2

The following operation was conducted with reference to Japanese Patent Laid-Open No. 2012-209195. A lithium metal piece (with a purity of 99% or more) that is 100 μm in thickness and 17.5 mg in weight was bonded to the inner bottom surface of a copper container. Particulate graphite (360 mg) (a negative electrode active material, 50% volume cumulative diameter D50=20 μm) that has been vacuum-dried for six hours was introduced into this container. Subsequently, an electrolyte solution (360 mg) was introduced into the copper container. The electrolyte solution is the same as in Example 1.

Next, a stir bar was put in the copper container and was rotated using a magnetic stirrer at 350 rpm, thereby stirring the electrolyte solution. The lithium metal piece bonded to the inner bottom surface of the copper container remained even after 144 hours from the initiation of stirring.

Comparative Example 3

Particulate graphite was doped with lithium in the same manner as in Example 4 except that particulate graphite (360 mg) that has been vacuum-dried for six hours was used instead of an aggregation in a slurry and filter paper immersed in an electrolyte solution was not stacked. Consequently, the lithium metal piece remained even after 144 hours from the initiation of pressurization.

The invention claimed is:

1. A method of manufacturing an electrode material, comprising statically pressurizing, in the presence of an alkali metal supply and a solvent, an amorphous aggregation comprising an active material,
   wherein, during the pressurizing, the aggregation is pressurized using press units with the aggregation sandwiched therebetween.

2. The method according to claim 1,
   wherein the press unit is a conductive member, and
   wherein the alkali metal supply is in contact with the press unit during the pressurizing.

3. The method according to claim 1, wherein the press unit has a plurality of through-holes.

4. The method according to claim 1, wherein the press unit has asperities on a surface adjoining the aggregation.

5. The method according to claim 1, wherein the aggregation is a mixture comprising the active material and the alkali metal supply.

6. The method according to claim 1, wherein the solvent and the active material are brought in contact with each other before initiation of the pressurizing.

7. A method of manufacturing an electrode material, comprising statically pressurizing, in the presence of an alkali metal supply and a solvent, an amorphous aggregation comprising an active material,
   wherein the solvent and the active material are brought in contact with each other after initiation of the pressurizing.

8. The method according to claim 1, wherein, after the pressurizing, the aggregation is stirred in the presence of at least the solvent.

9. The method according to claim 1, wherein the active material is a negative electrode active material.

10. A method of manufacturing a cell comprising at least one selected from the group consisting of a negative electrode and a positive electrode, wherein at least one of the negative electrode and the positive electrode is manufactured using the electrode material manufactured by the method according to claim 1.

11. A method of manufacturing a capacitor comprising at least one selected from the group consisting of a negative electrode and a positive electrode, wherein at least one of the negative electrode and the positive electrode is manufactured using the electrode material manufactured by the method according to claim 1.

12. The method according to claim 7, wherein, after the pressurizing, the aggregation is stirred in the presence of at least the solvent.

13. The method according to claim 7, wherein the active material is a negative electrode active material.

14. A method of manufacturing a cell comprising at least one selected from the group consisting of a negative electrode and a positive electrode, wherein at least one of the negative electrode and the positive electrode is manufactured using the electrode material manufactured by the method according to claim 7.

15. A method of manufacturing a capacitor comprising at least one selected from the group consisting of a negative electrode and a positive electrode, wherein at least one of the negative electrode and the positive electrode is manufactured using the electrode material manufactured by the method according to claim 7.

* * * * *